United States Patent
Zalevsky et al.

(10) Patent No.: US 10,033,996 B2
(45) Date of Patent: Jul. 24, 2018

(54) SYSTEM AND METHOD FOR IMAGING WITH PINHOLE ARRAYS

(71) Applicant: BAR ILAN UNIVERSITY, Ramat Gan (IL)

(72) Inventors: Zeev Zalevsky, Rosh HaAyin (IL); Moshe Arie Ariel Schwarz, Bnei Brak (IL); Amir Shemer, Petach Tikva (IL); Alexander Zlotnik, Ashdod (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 200 days.

(21) Appl. No.: 15/117,356

(22) PCT Filed: Feb. 5, 2015

(86) PCT No.: PCT/IL2015/050135
§ 371 (c)(1),
(2) Date: Aug. 8, 2016

(87) PCT Pub. No.: WO2015/118540
PCT Pub. Date: Aug. 13, 2015

(65) Prior Publication Data
US 2017/0163961 A1  Jun. 8, 2017

Related U.S. Application Data

(60) Provisional application No. 61/936,402, filed on Feb. 6, 2014.

(51) Int. Cl.
*H04N 13/00* (2018.01)
*H04N 13/133* (2018.01)
(Continued)

(52) U.S. Cl.
CPC ....... *H04N 13/133* (2018.05); *H04N 13/0025* (2013.01); *H04N 13/021* (2013.01);
(Continued)

(58) Field of Classification Search
CPC ............. H04N 13/0025; H04N 13/021; H04N 13/0217
See application file for complete search history.

(56) References Cited

U.S. PATENT DOCUMENTS 3,961,191 A  6/1976 Stoner et al.
5,436,958 A  7/1995 Taylor
(Continued)

FOREIGN PATENT DOCUMENTS

WO  2010/015805 A1  2/2010
WO  2010/119447 A1  10/2010

OTHER PUBLICATIONS

Bushboom et al., Coded aperture imaging with multiple measurements, J. Opt. Soc. Am. A, 14(5):1058-1065.
(Continued)

*Primary Examiner* — Neil Mikeska
(74) *Attorney, Agent, or Firm* — Browdy and Neimark, PLLC

(57) ABSTRACT

A method and system are provided, for imaging a region of interest with pinhole based imaging. The method comprising: collecting input radiation from the region of interest through a selected set of a plurality of a predetermined number of aperture arrays, each array having a predetermined arrangement of apertures and collecting the input radiation during a collection time period, wherein said selected set of the aperture arrays and the corresponding collection time periods defining a total effective transmission function of the radiation collection, generating image data from the collected input radiation, said image data comprising said predetermined number of image data pieces corresponding to the input radiation collected through the aperture arrays respectively, processing the image data pieces utilizing said total effective transmission function of the radiation collection, and determining a restored image of
(Continued)

the region of interest. The set of aperture arrays is preferably selected such that said total effective transmission function provides non-null transmission for spatial frequencies being lower than a predetermined maximal spatial frequency.

20 Claims, 26 Drawing Sheets

(51) Int. Cl.
  *H04N 13/02* (2006.01)
  *H04N 13/211* (2018.01)
  *H04N 13/218* (2018.01)

(52) U.S. Cl.
  CPC ....... *H04N 13/0217* (2013.01); *H04N 13/211* (2018.05); *H04N 13/218* (2018.05); *H04N 2013/0081* (2013.01); *H04N 2013/0092* (2013.01)

(56) References Cited

U.S. PATENT DOCUMENTS

| | | |
|---|---|---|
| 6,545,265 B1 | 4/2003 | Czarnetzki et al. |
| 2005/0243330 A1 | 11/2005 | Magarill et al. |
| 2006/0279845 A1 | 12/2006 | Gurevich et al. |
| 2007/0025638 A1 | 2/2007 | Ozcan et al. |
| 2007/0236769 A1 | 10/2007 | Zalevsky |
| 2008/0049293 A1 | 2/2008 | Deck |
| 2009/0020714 A1 | 1/2009 | Slinger |
| 2009/0022410 A1 | 1/2009 | Haskell |
| 2009/0095912 A1 | 4/2009 | Slinger et al. |
| 2010/0134869 A1 | 6/2010 | Bernet et al. |
| 2012/0140131 A1 | 6/2012 | Lanman et al. |
| 2012/0226480 A1 | 9/2012 | Berkner et al. |

OTHER PUBLICATIONS

Chang, et al., Coded Aperture Imaging of Gamma-Rays Using Multiple Pinhole Arrays and Multiwire Proportional Chamber Detector, IEEE Transactions on Nuclear Science, Feb. 1975, pp. 374-378, vol. NS-22.

Chen, et al., Three-Dimensional Reconstruction of Laser-Irradiated Targets Using URA Coded Aperture Cameras, Optics Communications, Jun. 1989, pp. 249-255, vol. 71, No. 5.

Dicke, Scatter-Hole Cameras for X-Rays and Gamma Rays, The Astrophysical Journal, Aug. 1968, pp. L101-L106, vol. 153.

Fenimore, E.E., Coded aperture imaging: predicted performance of uniformly redundant arrays, Applied Optics, Nov. 1978, pp. 3562-3570, vol. 17, No. 22.

Koral, et al., Digital Tomographic Imaging with Time-Modulated Pseudorandom Coded Aperture and Anger Camera, Journal of Nuclear Medicine, 1974, pp. 402-413, vol. 16.

Mu, et al., A novel three-dimensional image reconstruction method for near-field coded aperture single photon emission computerized tomography, Med. Phys, May 2009, pp. 1533-1542, vol. 36(5).

Schramm, et al., High-Resolution SPECT Using Multipinhole Collimation, IEEE Transactions on Nuclear Science, Jun. 2003, pp. 315-320, vol. 50, No. 3.

Schwarz, et al., Light intensity and SNR improvement for high-resolution optical imaging via time multiplexed pinhole arrays, Applied Optics, Jul. 2014, pp. 4483-4492, vol. 53, No. 20.

Vogel, et al., A New Method of Multiplanar Emission Tomography Using a Seven Pinhole Collimator and an Anger Scintillation Camera, The Journal of Nuclear Medicine, 1978, pp. 648-654, vol. 19.

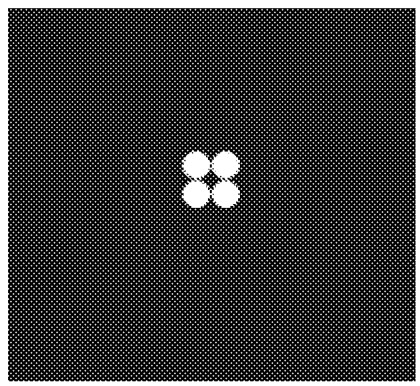
FIG. 9A
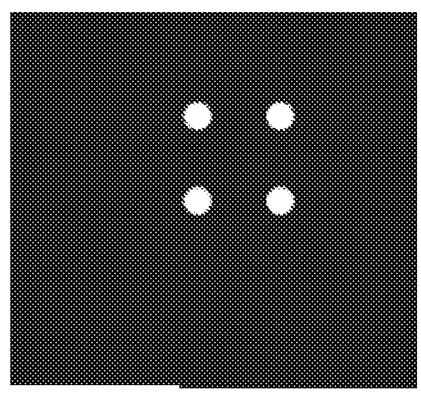
FIG. 9B
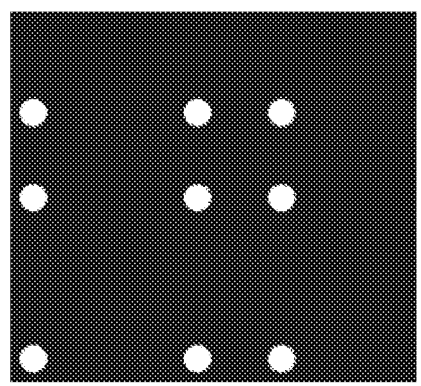
FIG. 9C
Array position 1          4 ●● 3
                          1 ●● 2
Array position 2          8 ●    ● 7
                          5 ●    ● 6
Array position 3    13 ●    12 ●    ● 11
                    14 ●     9 ●    ● 10
                    15 ●    16 ●    ● 17
FIG. 9D

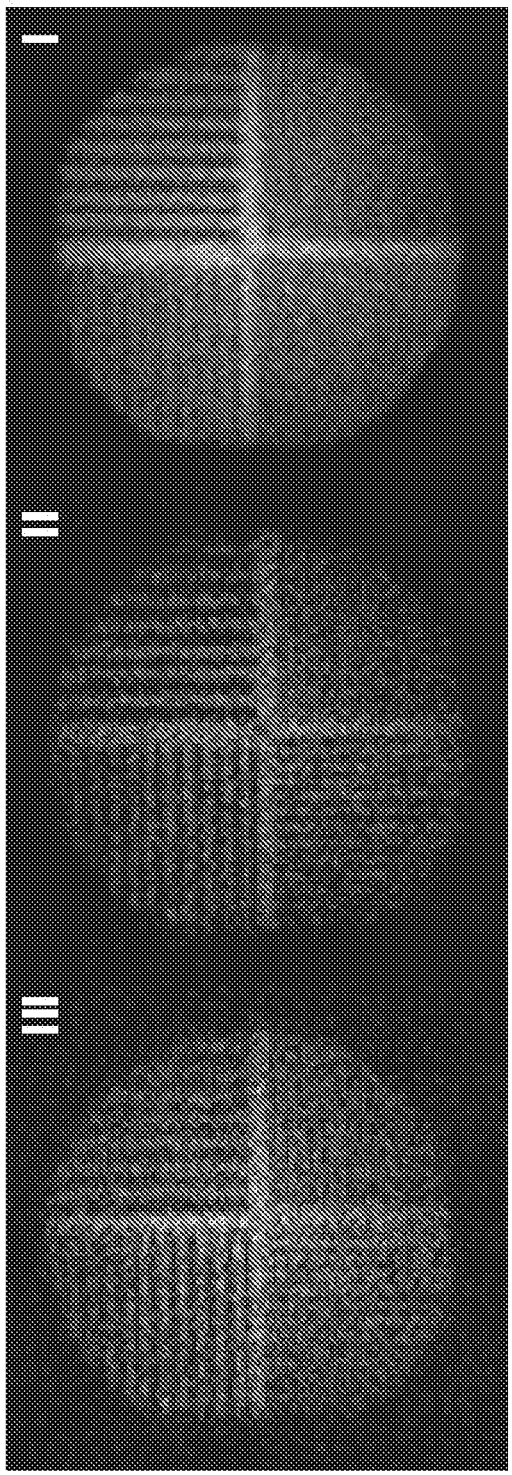

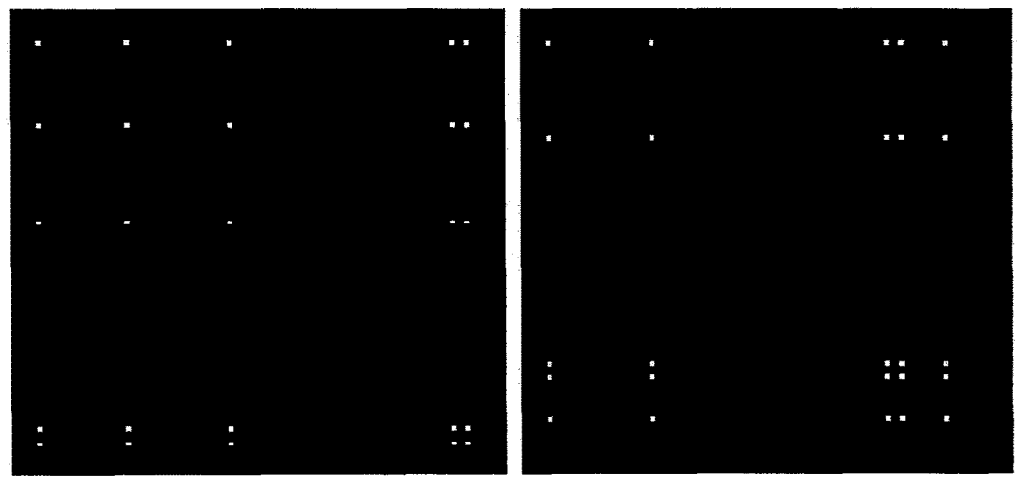
FIG. 14A  FIG. 14B
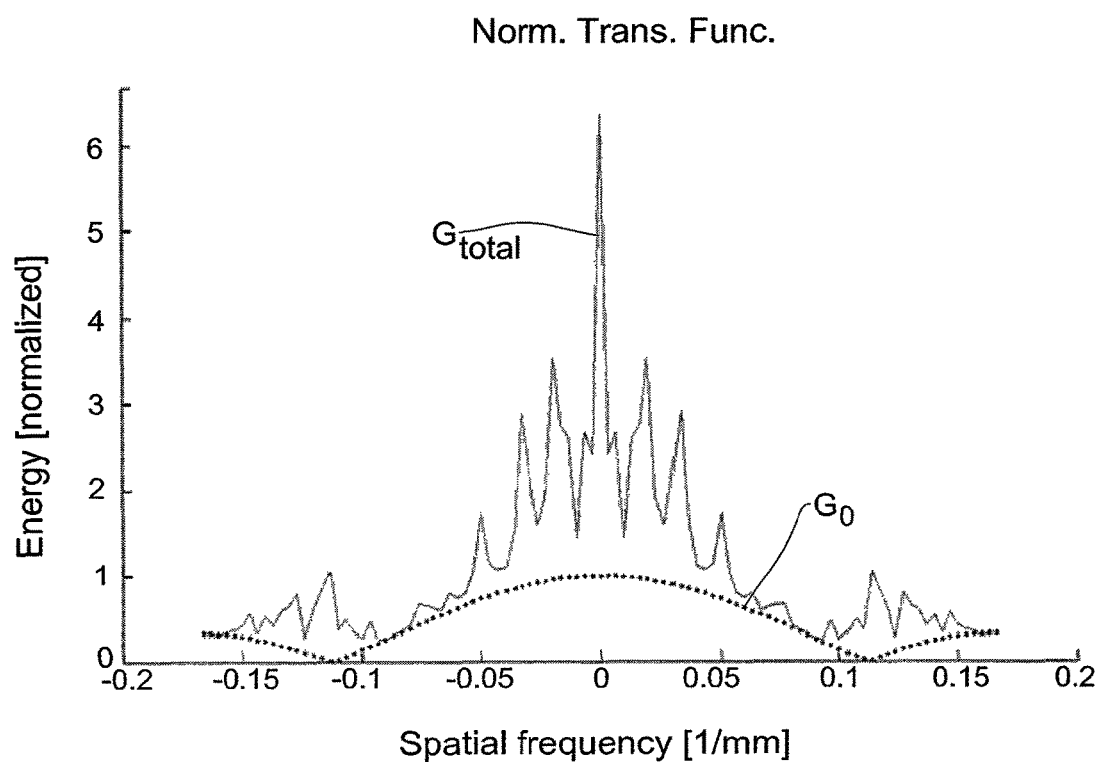
FIG. 14C

SYSTEM AND METHOD FOR IMAGING WITH PINHOLE ARRAYS

TECHNOLOGICAL FIELD

The invention is in the field of radiation imaging and relates to imaging techniques utilizing pinhole arrays.

BACKGROUND ART

References considered to be relevant as background to the presently disclosed subject matter are listed below:

[1] R. A. Vogel, D. Kirch, M. Lefree, and P. Steele, "A New Method of Multiplanar Emission Tomography Using a Seven Pinhole Collimator and an Auger Scintillation Camera," *J. Nucl. Med.* 19 (6), 648-654 (1978).

[2] N. U. Schramm, G. Ebel, U. Engeland, T. Schurrat, M. Béhé and T. M. Behr, "High-Resolution SPECT Using Multipinhole Collimation," *IEEE Trans. NucL Sci.*50 (3), 315-320 (2003).

[3] R. H. Dicke, "Scatter-hole cameras for x-rays and gamma rays," *Astrophys. J.* 153, L101-L106 (1968).

[4] L. T. Chang, B. Macdonald, V. Perez-Mendez, L. Shiraishi, "Coded Aperture Imaging of Gamma-Rays Using Multiple Pinhole Arrays and Multiwire Proportional Chamber Detector," *IEEE Trans. Nucl. Sci.* NS-22, 374-378 (1975).

[5] E. E. Fenimore and T. M. Cannon, "Coded aperture imaging: predicted performance of uniformly redundant arrays," Appl. Opt. 17 (2), 3562-3570 (1978).

[6] Mu Z, Hong B, Li S Liu Y H, "A noval three-dimensional image reconstruction method for near-field coded aperture single photon emission computerized tomography". Med Phys. 2009:36; 1533-1542.

[7] Chen Y W, Yamanaka M, Miyanaga N, Yamanaka T, Nakai S, Yamanaka C, "Three-dimensional reconstructions of laser-irradiated targets using URA coded aperture cameras". Opt Commun.1989:71; 249-255.

[8] Koral K F, Rogers W L, Knoll G F, "Digital tomographic imaging with time-modulated pseudorandom coded aperture and anger camera". J Nucl Med. 1974:16; 402-413

Acknowledgement of the above references herein is not to be inferred as meaning that these are in any way relevant to the patentability of the presently disclosed subject matter.

BACKGROUND

It is known for many years to use pinhole optics in imaging techniques. Light rays propagating from a region of interest on one side of a mask and passing through a small pinhole of the mask expanding on the other side of the mask and may be used to generate an image of the region of interest.

Pinhole optics may provide various advantages over the common use of lens systems, such as reducing linear distortion, providing virtually infinite depth of focus and wide angular field of view. Additionally, pinhole imaging is useful for non-optical radiation frequencies, such as X-rays, Gamma radiation and basically any wave—or particle-like phenomena.

Imaging characteristics of a pinhole generally depend inter alia on the cross-sectional dimension (diameter) of the pinhole. For a large pinhole, the resulting image is typically in the form of a uniform disc being a geometrical shadow of the pinhole. For a very small pinhole, the resulting image is a Fresnel or Fraunhofer diffraction pattern. Intermediate pinhole sizes can provide imaging of a scene. An optimal pinhole diameter can be determined as a compromise between the large spot image of the large pinhole and the wide diffraction pattern of the small pinhole size.

Within the image generating range of pinhole sizes there is a tradeoff between image resolution and light intensity. A larger pinhole transmits relatively higher radiation intensity, i.e. higher number of photons per time, but results in lower image resolution. On the other hand, the smaller pinholes provide high resolution image but with lower radiation intensity. This may result in darker image and/or may require longer exposure times. Thus, the pinhole size affects image resolution, contrast, brightness, exposure times, and signal to noise ratio.

Several techniques are known, aimed at improving imaging techniques utilizing a plurality of pinholes to improve brightness and/or resolution.

WO 2010/119,447 describes an optical system for use with a predetermined light detection surface comprising a multitude of light sensitive pixels. The optical system comprises an optical window defining a predetermined light transmission pattern formed by a multiple spaced apart light transmissive regions, configured in accordance with said multitude of light sensitive pixels. The configuration of said multiple spaced apart light transmissive regions define an irregular arrangement of said regions with respect to said multitude of light sensitive pixels. Said optical window with said irregular arrangement is configured for collecting light beams from different directions from a scenery to be imaged and for directing, on each of said light sensitive pixels, the light component formed by a distinct set of light intensities, corresponding to said light beams collected from different directions, thereby providing spatially distinct light intensity patterns overlapped on said light detection surface and corresponding to said light beams collected from different directions.

U.S. Pat. No. 6,545,265B describes a method for mixing pairs of confocal images and different arrangements for fast generation of parallel confocal images and the combination thereof in real time. The method is used for improving contrast and resolution in confocal images. The suggested arrangements point to some possibilities for a meaningful application of the method for image mixing in parallel confocal single-beam or double-beam methods for the generation of highly resolved images in real time for a wide variety of different applications, especially also for material inspection. By combining at least two confocal images, a resolution of the fine structure of the object is achieved in the mixed image. Contrast, lateral resolution and depth resolution are improved in the mixed image of the object to be examined, which can also be a phase object. Further, the method permits the generation of very highly resolved three-dimensional digital images of optical objects to be examined.

US 2006/279,845 describes an optical system comprised of a monolithic microlens array assembly that consists of two groups of microlenses sub-assemblies having different pitches between the adjacent lenses. A ratio between the pitches of sub-assemblies is determined by a predetermined relationship between the parameters of the optical system so that the microlenses of the first sub-assembly create a plurality of individual intermediate images arranged side-by-side in a common intermediate plane that are transferred by the microlenses of the second sub-assembly to the final image plane in the form of a plurality of identical and accurately registered images interposed onto each other. This is achieved due to the aforementioned ratio between the pitches.

GENERAL DESCRIPTION

There is a need in the art for a novel technique enabling high resolution imaging utilizing one or more pinhole arrays. The technique of the present invention allows for producing high quality image data of a region of interest utilizing two or more arrays of pinholes, each array having a predetermined different arrangement of pinholes. The arrangements of pinholes in the two or more arrays are selected to provide desired total effective transmission function of radiation collection during two or more image acquisition steps through respectively said two or more pinhole arrays.

Generally, pinhole based imaging requires selection between image resolution (optical resolution) and intensity (energy), and according to the convention approach the improvement of one of this factor is unavoidably on the cost of the other. However, the technique of the present invention allows utilizing the benefits of pinhole imaging, for imaging with optical as well as non-optical radiation, while providing greater input intensity without reducing the resolution achieved. This is achieved in the technique of the present invention by utilizing the concept of pinhole imaging in combination with spatial and temporal image multiplexing to provide efficient imaging and enabling high quality reconstruction of the image data.

According to the technique of the invention, input radiation (optical or non-optical) propagating from a region of interest is collected by an imaging system for a predetermined total exposure time. The input radiation is being sequentially imaged through a set of two or more pinhole (aperture) arrays for corresponding time periods. Each pinhole array is a mask formed by a radiation blocking surface having a preselected arrangement of one or more pinholes of predetermined dimensions and shape allowing transmission of radiation.

The set of pinhole arrays comprises two or more pinhole arrays (e.g. masks having predetermined number of pinholes), each comprising an arrangement of predetermined number of pinholes of selected desired dimension(s) and geometry/shape(s). For each array, radiation collected by the pinholes results in multiple overlapping images on an imaging plane (of a detector). According to the present technique, the multiplicity of such overlapping images is collected for predetermined exposure time. Thus, a sequence of two or more input image data pieces are produced via collection of input radiation by the two or more pinhole arrays, respectively, each image data piece corresponding to a selected pinhole array and a selected collection (exposure) time. The image data pieces are then processed based on the arrangement of the pinholes in each array and exposure time(s) defining together the total effective transmission function, to determine a restored image data indicative of the region of interest.

Generally, radiation transmission through an array of two or more pinholes generates loss of information due to interference of radiation portions passing through the different pinholes. This can be seen in a spectrum of spatial frequency transmission associated with the pinhole array and having one or more spatial frequencies with zero transmission. The technique of the present invention utilizes a set of two or more pinhole arrays selected such that if one of the arrays has zero or low transmission for a certain spatial frequency within desired resolution limits, one or more other arrays of the set is/are configured to have higher transmission at said spatial frequency, such that the total effective transmission function provides non-null transmission for all spatial frequencies within desired resolution limits. Thus, the proper selection of aperture arrays such that cumulative transmission of the set forms an effective transmission function with non-null values within the desired resolution limits. This selection of the set of aperture arrays also provides for relatively simple and efficient post processing of the input image data to generate restored image of the region of interest. The processing just utilizes data about the total effective transmission function and its inverse operator for image reconstruction.

Thus, according to one broad aspect of the present invention, there is provided a method for imaging a region of interest. The method comprising:

(a) collecting input radiation from the region of interest through a selected set of a plurality of a predetermined number of aperture arrays, each array having a predetermined arrangement of apertures and collecting the input radiation during a collection time period, wherein said selected set of the aperture arrays and the corresponding collection time periods defining a total effective transmission function of the radiation collection, (b) generating image data from the collected input radiation, said image data comprising said predetermined number of image data pieces corresponding to the input radiation collected through the aperture arrays respectively, (c) processing the image data pieces utilizing said total effective transmission function of the radiation collection, and determining a restored image of the region of interest.

The set of aperture arrays is preferably selected such that said total effective transmission function provides non-null transmission for spatial frequencies being lower than a predetermined maximal spatial frequency. Generally, this maximal spatial frequency may be defined by a minimal aperture size. The minimal aperture size defining the maximal spatial frequency may be selected in accordance with geometrical resolution of image detection.

According to some embodiments, the corresponding collection time periods of the selected aperture arrays are selected for optimizing transmission intensities for selected spatial frequencies.

According to some embodiments, the method may further comprise: detecting said image data pieces using a single readout mode for all of said collection time periods of the aperture arrays, thereby integrating said image data pieces to form the image data in one scan time while selectively using the different aperture arrays. Alternatively, a dedicated readout session may be utilized for each aperture array and the resulting image data pieces may be summed numerically.

According to some embodiments, processing of the image data pieces for restoring the image of the region of interest may comprise: receiving or determining a sum of intensity maps of said image data pieces and utilizing inverting the distortion effect caused by the total effective transmission function, to thereby generate said restored image data. The processing may comprise utilizing a Weiner deconvolution of the effective transmission function.

In some embodiments, the restored image data may be determined in spatial frequency domain.

It should be noted that the method of the invention may be used with input radiation being electromagnetic radiation in at least one of the following spectra: infra-red radiation, visible light, ultra violet radiation, x-ray radiation, and gamma radiation.

According to some embodiments, said processing of the image data pieces for determining the restored image data may further comprises: providing a set of at least two different depth resolved effective transmission functions each corresponding to the collection of the input radiation from an object plane of the region of interest located at a different distance from said set of the aperture arrays; for each of the depth resolved effective transmission functions, determining a partially restored image data piece corresponding to the respective object plane; and generating data indicative of a three-dimensional restored image of the region of interest. The at least two different depth resolved effective transmission functions may be determined based on virtual aperture arrangement in accordance with varying magnification for imaging from selected object planes.

According to some embodiments, the set of aperture arrays and the corresponding arrangement of apertures thereof may be selected in accordance of a desired Radiation Intensity Improvement (RII) factor to provide imaging of the region of interest with improved image brightness.

In some embodiments, the selection of said set of a plurality of a predetermined number of aperture arrays and the corresponding arrangement of apertures thereof may comprise: determining desired resolution for imaging and a corresponding minimal aperture dimension; determining the shape and angle of each aperture, determining a number of aperture to provide desired brightness of imaging; determining said predetermined number of arrays; determining aperture arrangement in each array to provide non-null total effective transmission function of the set of aperture arrays. Determining of the aperture arrangement may comprise: determining aperture arrangement of a first array; determining a corresponding effective transmission function; identifying spatial frequencies for which said effective transmission function provides transmission lower than a predetermined threshold; and determining one or more additional aperture arrangement such that transmission of said one or more of the additional aperture arrangement at said identified spatial frequencies is above a predetermined threshold.

According to one other broad aspect of the invention, there is provided an imaging system comprising:

(a) a mask defining a radiation collection surface for spatial filtering of input radiation being collected, the mask comprising a plurality of apertures and being configured and operable to selectively provide a plurality of a predetermined number of spatial filtering patterns of the mask, each filtering pattern being formed by a predetermined arrangement of apertures in said collection surface;

(b) a control unit comprising: a filtering controller module; an image acquisition module and an image processing module; wherein the filtering module is configured for operating said mask to selectively collect the input radiation by different filtering patterns during selected exposure time periods; the image acquisition module is configured for receiving image data pieces corresponding to the collection of the input radiation through said filtering patterns respectively during said selected exposure time periods; and the image processing module is configured for receiving and processing the image data pieces and utilizing data indicative of a total effective transmission function of the radiation collection through said mask, and determining a restored image data of a region of interest from which the input radiation is being collected.

The selected plurality of a predetermined number of spatial filtering patterns of the mask may be preselected to provide said effective transmission function with non-null transmission for spatial frequencies lower than a desired predetermined maximal spatial frequency.

Generally, the mask may be configured as a replaceable mask comprising plurality of a predetermined number of spatial filtering patterns such that the mask may be configured to selectively place a selected spatial filtering pattern on the radiation collection surface of the mask. For example, the mask may be configured as a mechanical wheel comprising said two or more aperture arrays each defining a corresponding filtering pattern. Additionally or alternatively, the mask may be configured as a radiation transmission modulator and configured to electronically vary filtering pattern thereof.

According to some embodiments, the mask may comprise a multiplexed arrangement of apertures corresponding to said predetermined number of spatial filtering patterns, said multiplexed arrangement of apertures may comprise groups of apertures corresponding to different filtering patterns, each group of apertures comprises a wavelength selective filter configured for transmission of a predetermined wavelength range being a part of a total wavelength range for imaging.

The processor unit may further comprise a set selection module configured to be responsive to input data comprising data about desired resolution and brightness and to determine a corresponding set of filtering patterns having non-null effective transmission function.

According to yet some embodiments, the processor unit may further comprise a depth resolution pre-processing module configured to determine depth resolved effective transmission function in accordance with aperture arrangement of the set of filtering patterns. The image processing module may be configured and operable to determined a plurality of restored depth resolved image data pieces, each of the depth resolved restored image data pieces corresponds to a selected object plane in accordance with a corresponding depth resolved effective transmission function, thereby providing three-dimensional information about the region of interest.

According to some embodiments, the system may be configured for imaging with input radiation of at least one of the following wavelength ranges: IR radiation, visible light radiation, UV radiation, X-ray radiation, Gamma radiation.

According to yet one other broad aspect of the invention, there is provided a method for use in pinhole based imaging, the method comprising: determining a pinhole dimension based on data about: locations of object plane, location of image plane and desired maximal resolution; determining a desired number of apertures based on desired image brightness per time unit; selecting a first aperture array comprising one or more apertures of the desired dimension; determining a first set of spatial frequency values for which transmission of said first aperture array is below a predetermined threshold; determining at least one additional aperture array having aperture arrangement providing that transmission at said first set of spatial frequencies is above a corresponding predetermined threshold; wherein a total number of apertures divided by a total number of arrays provides a factor for said desired brightness per time unit.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 9A-9K exemplify the principles of selection of a set of aperture arrays and imaging mode, utilizing the technique of the present invention;

FIGS. 12A-12C show experimental Gamma imaging of a test object using single pinhole and using a set of aperture arrays according to the technique of the invention;

FIGS. 14A-14C shows one more example of a set of pinhole arrays suitable for use with the technique of the present invention.

DETAILED DESCRIPTION OF EMBODIMENTS

Figure 1A:
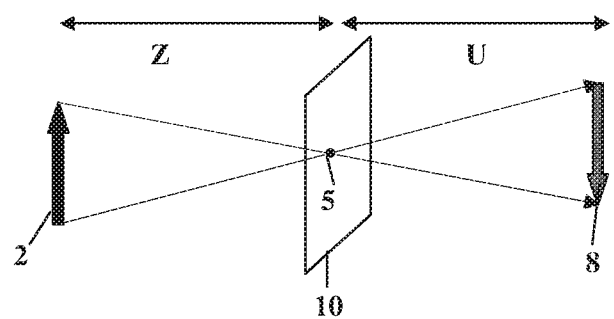
FIGS. 1A-1B exemplify the principles of pinhole based imaging using a mask with one pinhole (FIG. 1A) and a mask with two pinholes (FIG. 1B)
Figure 1B:
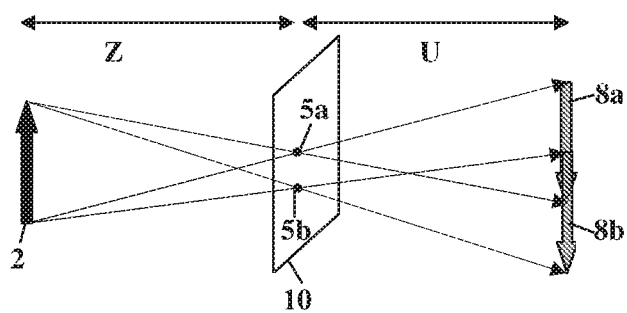

Reference is made to FIGS. 1A and 1B, there schematically shown the principles of pinhole based imaging of an object 2 in a region of interest using single- and multi-pinhole imaging system. As shown in FIG. 1A, input radiation coming from the object 2 (e.g. emitted or reflected from the object) is collected by a radiation collection surface of a pinhole based imaging system to form an image 8 on an image plane. In this example, the radiation collection surface is defined by a mask 10 in the form of radiation blocking surface having an aperture 5 of a predetermined dimension and shape. As generally known in the art, radiation transmission through the aperture 5 provides an inverted image 8 of the object 2 in the image plane, which can be viewed on a screen or collected by a detector.

As indicated above, such pinhole based imaging system can provide imaging with effectively infinite depth of focus. Additionally, the imaging system provides magnification based on a ratio between the distance Z of the object plane 2 to the aperture mask 10 and the distance U of the image plane (screen, detector) and the mask (i.e. radiation collecting surface). Thus, the imaging system provides magnification of:

$$M = U/Z \quad \text{(equation 1)}$$

Additional parameters, such as image resolution and brightness, are determined by dimension (e.g. diameter) of the pinhole in relation to the wavelength of radiation used and the distance to the image plane U.

Generally, in order to achieve high resolution imaging, the angular separation (minimal difference in angular orientation if two features visible as separated on the image plane) is selected to be as small as possible. However, for apertures having large radius R in the geometric limit, $R^2 \gg \lambda U$, the angular separation $\theta_{geometric}$ is reduced, while for smaller apertures, the angular separation $\theta_{diffraction}$ is proportional to the inverse of the radius:

$$\theta_{geometric} \approx 2R\frac{Z+U}{ZU}$$

$$\theta_{diffraction} \approx 0.61\frac{\lambda}{R}$$

It can be estimated that using a pinhole having a radius $R = \sqrt{0.61\lambda U}$ for imaging of a region of interest located in far field distance and a pinhole having a radius $R \approx \sqrt{0.61\lambda U/(1+M)}$ for imaging of an object located in near field distance, will provide high resolution imaging. Such resolution may be diffraction limited, and the smallest features seen separated at the image plane (screen) have a size of $$\rho = 0.61\frac{\lambda U}{R}$$

when imaging objects in large distances from the mask; or about the diameter of the pinhole (i.e. 1R-1.5R) for imaging objects in relatively close proximity or near field. These resolution limits are based on Rayleigh condition.

In this connection, for the purposes of the present application, the terms near- and far-filed distances should be interpreted differently than is generally known in optics. In pinhole based imaging, far-field distance is defined as a distance between the object plane and the radiation collecting surface being large enough such that a phase difference between the radiation components collected at the opposite ends of an aperture is much less than the wavelength, i.e. the wavefront of the radiation from the object plane arriving at the radiation collection surface is substantially planar. In such distance individual contributions of radiation components interacting with the pinholes can be treated as though they are substantially parallel. Generally far-field distance is significantly greater than $W^2/\lambda$, where $\lambda$ is the wavelength and W is the largest dimension of the aperture. The Fraunhofer equations can be used to model the diffraction effects of the radiation passage through the pinhole in such far-field distances. Thus, generally far-field is defined when the distance from the object plane to the pinhole mask is larger than the area of the apertures in the mask divided by the wavelength of radiation used. Similarly, near-field condition exists when the distance from the object plane to the mask is smaller than the ratio of the largest aperture's area and the wavelength.

As also noted above, the larger the aperture size, the higher the image brightness, as more input radiation may pass through the larger aperture and reach the image plane. This also reduces the signal to noise ratio of the detection. Therefore, pinhole imaging according to the conventional approach has an inherent tradeoff between image resolution and brightness limiting the uses thereof.

In this connection, FIG. 1B illustrates imaging of an object 2 through a mask 10 having two apertures 5a and 5b. In general, such imaging system may provide similar image resolution while twice the collected intensity. However, if the two apertures are not separated enough, the two images 8a and 8b are overlapping. This reduces the ability to differentiate between spatial features in the collected image.

Figure 2:
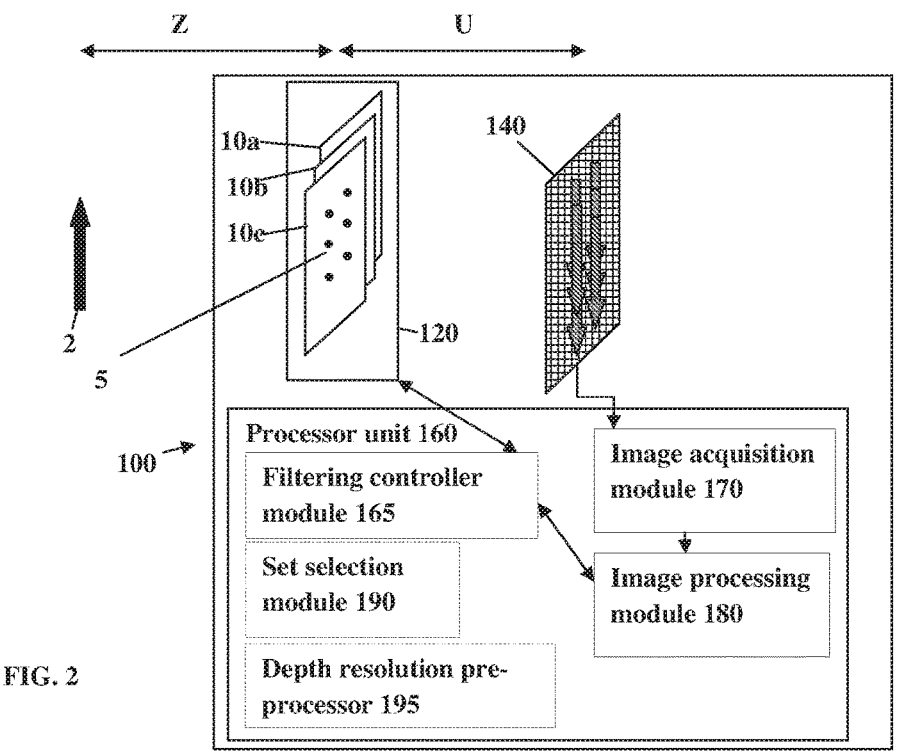
FIG. 2 schematically illustrates an imaging system utilizing pinhole based imaging according to some embodiments of the present invention.

The present invention provides a novel approach for use in pinhole based imaging, while enabling to increase image brightness without the need to sacrifice resolution. In this connection, reference is made to FIG. 2 illustrating a system 100 for pinhole based imaging of a region of interest. The system 100 includes a mask unit 120 formed by at least one physical mask defining a radiation collection surface for input radiation arriving from the region of interest, and a processor unit 160.

According to the invention, the radiation collection is performed by sequentially or selectively collecting radiation with different arrays of pinholes (i.e. different spatial filtering patterns). This may generally be implemented by replacing a mask (pattern) in the radiation collection path. Preferably, however, the mask 120 may include a single mask configured and operable to define two or more different spatial filtering patterns and selectively collect input radiation with one selected spatial filtering pattern at a time (i.e. during a collection session). The mask has radiation transmitting regions (pinholes, apertures, windows) arranged in spaced-apart relationship within the radiation collecting surface. It should be noted that such radiation transmitting regions spaced by blocking regions may be implemented as a passive mask or electronic mask (spatial radiation modulator). It should also be noted, and will be described more specifically further below, that the light collecting surface may be planar, i.e. all the radiation transmitting regions are located in substantially the same plane, or may not be planar such that different radiation transmitting regions are located in different planes. The latter may be implemented by providing a certain surface relief of the mask or by making the radiation transmitting regions at different depths of the mask. To facilitate understanding, in the description below, such radiation transmitting regions are referred to as apertures or pinholes.

Thus, each of the spatial filtering patterns is formed by a predetermined arrangement of spatially separated apertures in the collection surface. Generally, the mask 120 may include (or operated to define in case of electronic mask) two or more pinhole arrays (three arrays 10a-10c are shown in the figure), each defining a different spatial filtering pattern, and may be associated with a suitable mechanism for selectively utilizing each of the different pinhole arrays for collection of input radiation. The mask 120 may for example be configured as a rotating plate, as will be described further below, made with apertures such that displacement of the plate results in that one of the two or more patterns is involved in the radiation collection, i.e. is in the active region of the mask with respect to the radiation propagation. Alternatively, a spatial radiation modulator (such as spatial light modulator SLM that may include suitable polarizers on each aperture thereof) may be used and operable to electronically vary transmission of regions therein.

In some embodiments, the mask 120 may be in the form of single plate having plurality of apertures of two or more groups (arrays); each group of apertures defines a spatial filtering pattern. For example, each of the aperture groups may include a wavelength selective filter allowing transmission of input radiation of a wavelength range being part of the spectrum used for imaging, thus providing multiplexed selective filtering of input radiation.

It should be noted that, generally, any appropriate technique for applying selective spatial filtering to input radiation with the set of aperture arrays may be used such that imaging is provided through two or more selected aperture arrays. Specifically, the mask 120 includes two or more pinhole arrays, e.g. 10a and 10b, each configured with a selected predetermined number and arrangement of pinholes of predetermined dimensions and shapes.

Thus, input radiation from the region of interest is collected through a selected set of a plurality of a predetermined number of aperture arrays, where each array has a predetermined arrangement of apertures and is operated to collect the input radiation during a collection time period. The selected set of the aperture arrays defines a predetermined total effective transmission function of the radiation collection. Preferably, also the corresponding collection time periods for the aperture arrays are selected to further optimize the image quality. For each radiation collection session implemented using the selected aperture array, image data piece is created, to thereby generate image data of the cumulative radiation collection sessions through the set of aperture arrays. The image data is processed utilizing the data about the total effective transmission function of the radiation collection, and a restored image of the region of interest is determined.

Preferably, the set of aperture arrays is selected such that the total effective transmission function provides non-null transmission for spatial frequencies lower than a predetermined maximal spatial frequency. The maximal spatial frequency is typically defined by a minimal aperture size, which may in turn be selected in accordance with geometrical resolution of image detection. The collection time periods of the selected aperture arrays are selected for optimizing transmission intensities for selected spatial frequencies.

As shown in FIG. 2, the processor unit 160 may be connected to the mask assembly 120 for controlling its operation for selectively utilizing the different aperture/pinhole arrays for collection of input radiation (e.g. shifting/rotating the mask to place a different aperture array in the radiation collection path). Additionally, the processor unit 160 may be connectable to a detector 140 which may be a constructional part of the system or not, for receiving detector output indicative of the image data pieces generated from input radiation impinging on the radiation sensing surface of the detector 140.

The processor unit 160 may thus include a filtering controller module 165 configured to operate the mask assembly 120 to sequentially select a spatial filtering pattern to be used for light collection session (e.g. select a pinhole/aperture array such as 10a, 10b or 10c in FIG. 2). Further provided in the processor is an image acquisition module 170 configured for receiving image data pieces generated by the detector 140 in response to collected input radiation for a selected collection time period. The processor unit 160 further includes an image processing module 180 configured for receiving the image data pieces from the image acquisition module 170 and processing the image data pieces to determine a restored image data of the region of interest.

The system may be configured for determining data indicative of a set (e.g. sequence) of spatial filtering patterns to be used in the radiation collection sessions, using a set selection module 190 being part of the processor unit 160 or a separate control unit. The set selection module 190 is configured to select and determine the set of aperture arrays, as will be described further below. Alternatively, such data about the set of aperture array and their corresponding collection time periods may be previously determined and provided as input data to the system.

The processor unit may also include a depth resolving pre-processor 195 configured for determining a so-called depth resolved total effective transmission functions corresponding to radiation collection through the above-described set of aperture arrays from different locations respectively of the object plane. This will also be described more specifically further below.

Reference is made to FIG. 3, FIGS. 4A-4C and FIG. 5 exemplifying three mask assembly configurations providing three filtering patterns each formed by an aperture array.

Figure 3:
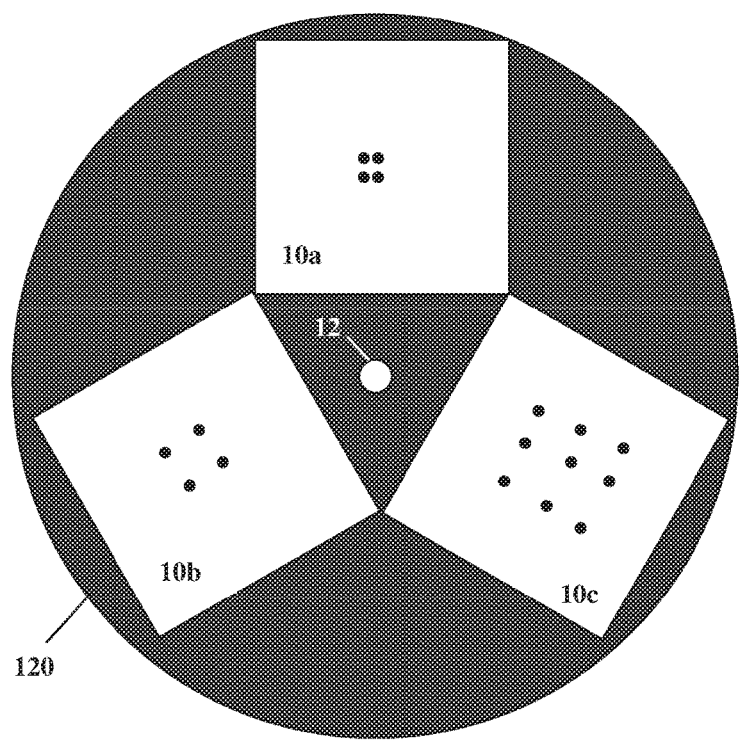
FIG. 3 exemplifies a mask defining a plurality of aperture arrays suitable for use in the imaging system of the present invention.

FIG. 3 shows a mask assembly formed by a single rotating mask 120 having three (generally two or more) regions 10a, 10b and 10c each including a different array of apertures, i.e. different apertures' arrangement providing a different spatial filtering pattern for the radiation being collected. The mask is, selectively rotatable about a rotation axis 12 to selectively place one of the regions 10a, 10b and 10c in radiation collection path. The number of the regions and the arrangement of apertures therein (including size(s) of the apertures and their relative accommodation) are selected to provide the desired total effective transmission function as described above.

Figure 4A:
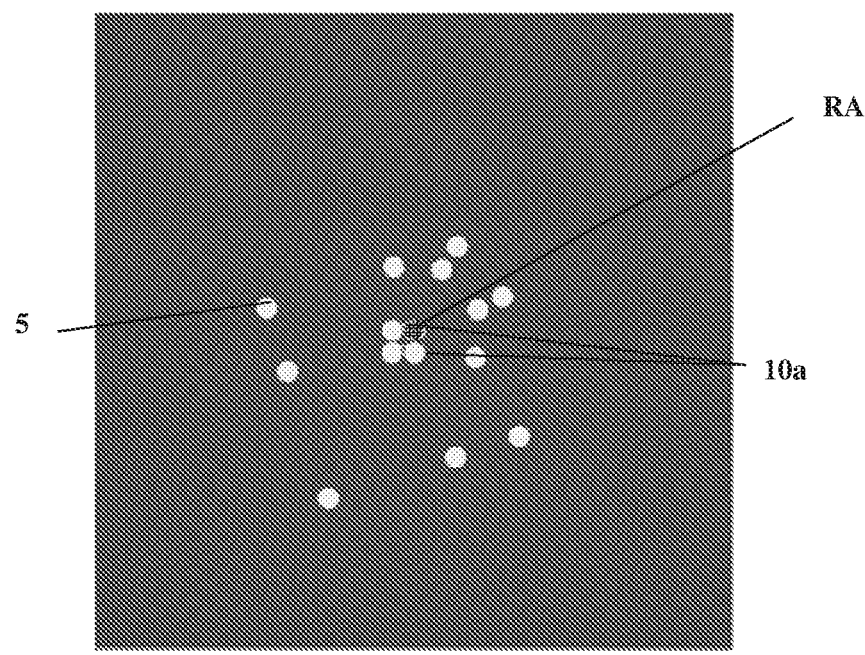
FIGS. 4A-4C shows another example of a mask configuration suitable for use in the system of the present invention.
Figure 4B:
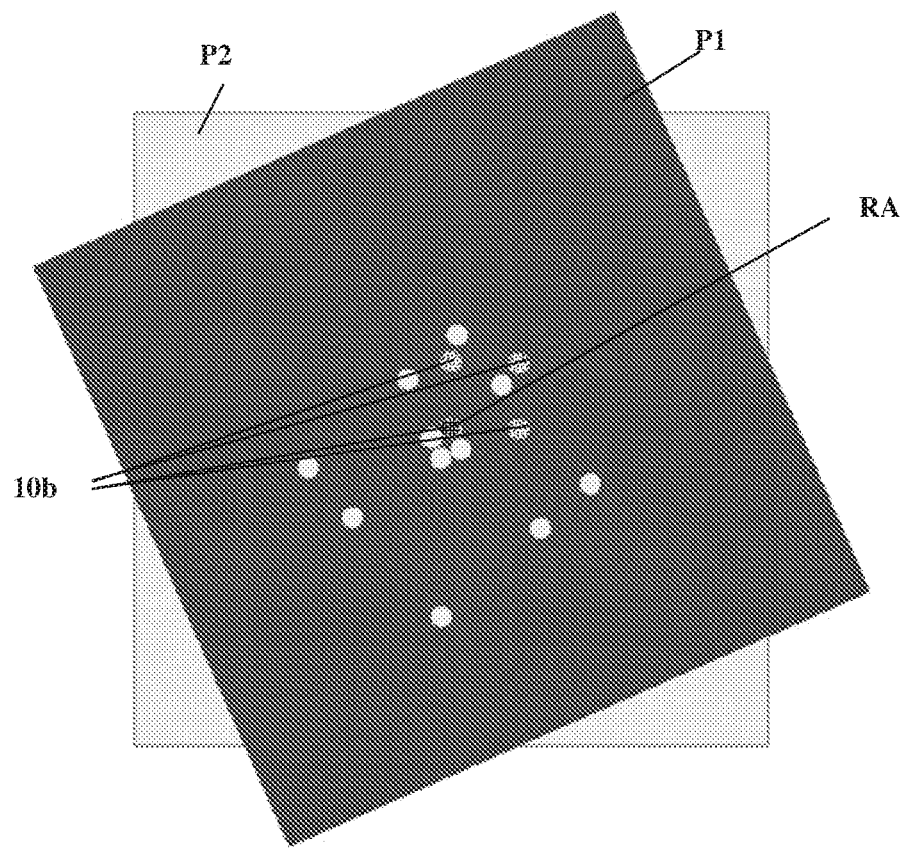
Figure 4C:
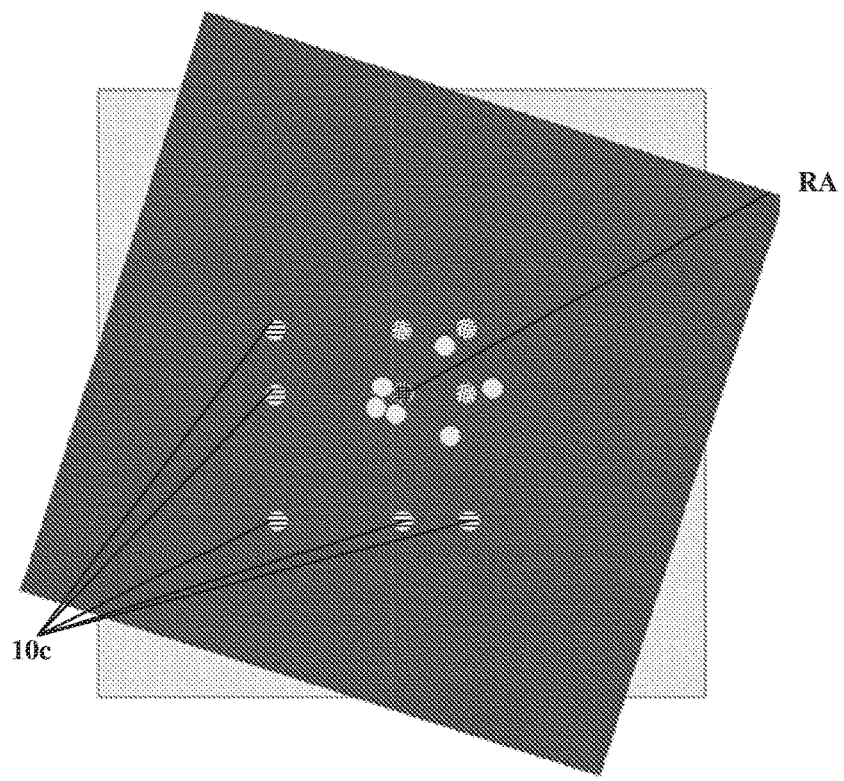

FIGS. 4A-4C show a filtering mask assembly 120 which define a plurality of spaced-apart apertures, generally at 5. In this example, the mask assembly defines a single mask which is formed by two plates, P1 and P2 as shown in FIG. 4B, configured such that at least one plate is rotatable with respect to the other about an axis RA. Each plate is formed with multiple apertures. Relative rotation of the plates results in that each respective orientation of the plates creates a different active apertures' array (spatial filtering pattern) for use in radiation collection. In the present not limiting example, one of the plates, e.g. plate P2, is configured such that it includes all the apertures required to create the desired set of the selected aperture arrays, while the other plate P1 has the same apertures' arrangement but with at least one of the arrays having a different angular orientation as compared to the at least one other array in the same plate. More specifically, the mask assembly is configured such that when the two plates P1 and P2 are aligned at angular orientation Φ=0 the apertures 5 relating to aperture array 10a in plate P1 overlap the corresponding apertures in plate P2 and thus allow transmission of radiation there through (FIG. 4A). As at least one of the two plates is rotated with respect to the other plate, the angular orientation between the plates is different resulting in a different overlapping between the apertures providing a different active set of apertures. FIGS. 4B and 4C exemplify the arrays resulting from the angular orientations between the plates of respectively 30° and 60° resulting in different active apertures arrays 10b and 10b.

Figure 5:
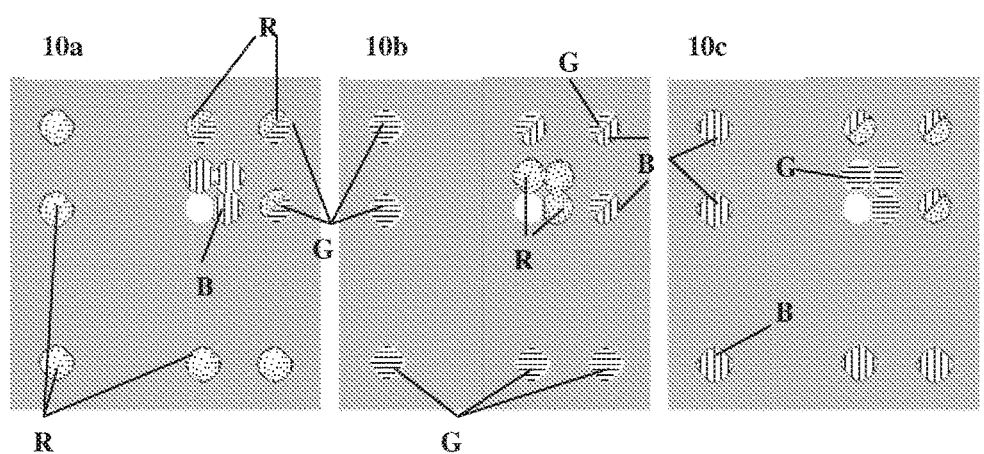
FIG. 5 shows yet another example of a mask configuration for use in the system of the present invention.

FIG. 5 exemplifies a different configuration of a mask assembly 120. Here the mask assembly includes a mask with multiple apertures and a spectral filter aligned with and located close to the mask. The spectral filter is operable to have different spectral transmissions (illustrated here for simplicity by primary colors R, G, B) in different radiation collection sessions. The spectral transmissions may be such that the entire aperture provides transmission of one or more spectral bands. The number of the apertures and their arrangement (including size(s) of the apertures, their relative accommodation, and groups of spectral band associated with the apertures due to controlled variation of the spectral transmission of the spectral filter) are selected to provide the desired total effective transmission function as described above.

Reference is made to FIGS. 6A to 6F illustrating the principles of a somewhat different embodiment of the invention. In this example, the set of aperture arrays is arranged such that apertures are spaced also along an optical axis, i.e. are located in different planes of the radiation collection surface. In other words, the apertures are located such as to define pre-determined radiation collection plane, including a so-called primary collection plane U1, and at least one other plane located closer or further to the image plane as compared to the primary plane. In this example, three such collection planes are shows. In this configuration, local effective transmission functions of the radiation collection by the apertures of the closer plane U2 and the apertures of the further plane U3 are respectively stretched and condensed in the spatial domain with respect to that of the apertures of the primary plane U1. The stretch/condensing factors are a priori known. Then, the image data pieces corresponding to radiation collection by apertures of the collection planes U2 and U3 are processed by applying the a priori known stretch/condensing factors to the respective local effective transmission functions, and the results for the collection planes U1,U2,U3 are summed to get the total effective transmission function. As indicated above, the number of the apertures and their arrangement are selected to provide the desired total effective transmission function as described above.

The following is the description of the operational principles of the above-described imaging technique of the invention.

To this end, a single image piece formed at the detector 140 by input radiation collected through an aperture array having N pinholes is:

$$S_{array}(x, y) = \sum_{n=1}^{N} \sum_{m=1}^{N} s(x + d_n^{(x)}, y + d_m^{(y)}) \quad \text{(equation 3)}$$

where $d_n^{(x)}$, $d_m^{(y)}$ are the (x,y) coordinated of the locations of the pinholes within the array relative to the center of the array, S(x,y) is the image generated by a single pinhole and $S_{array}(x,y)$ is the image generated by radiation collection through the array. Generally, the processor unit 160 and the image processing module 180 thereof utilize the image data pieces in the spatial frequency domain. To this end the image processing module 180 may include a Fourier module configured to determine the 2-dimensional Fourier transform (typically a discrete Fourier transform) of the collected image data pieces, providing:

$$S_{array}(u,v) = \iint S_{array}(x,y) e^{-2\pi i(ux+vy)} dx dy \quad \text{(equation 4)}$$

This Fourier transformed image data piece can be represented as a product of a single pinhole image and the array configuration:

$$S_{array}(u,v) = S(u,v) \cdot F(u,v) \quad \text{(equation 5)}$$

where S(u, v) is the Fourier transform of the image generated by a single pinhole and F defines an effective transmission function of a pinhole array having plurality of N pinholes:

$$F(u, v) = \sum_{n=1}^{N} \sum_{m=1}^{N} e^{-2\pi i \left(u d_n^{(x)} + v d_m^{(y)}\right)} \quad \text{(equation 6)}$$

It should be noted that a radiation transmission through a single array of pinholes may generally cause interference between radiation components passing through different pinholes of the array. Thus, the effective transmission function F (u, v) of a single pinhole array, having more than a single pinhole, typically has zero transmission for certain spatial frequencies. To avoid reducing of sensitivity to spatial frequencies, the technique of the present invention utilizes a predetermined number of two or more aperture arrays.

Generally, the filtering controller module 165 selects first aperture array and the image acquisition module 170 generates image data piece corresponding to radiation collection within exposure time $t_1$, a second aperture array is used for collection of radiation from the same region of interest for exposure time of $t_2$, and similarly for additional aperture arrays if used. For a plurality of L arrays, each used for exposure time period of $t_l$ the resulting Fourier transformed image data is:

$$\sum_{l=1}^{L} S_{array}^{(l)}(u, v) \cdot t_l = S(u, v) \sum_{l=1}^{L} F^{(l)}(u, v) \cdot t_l \quad \text{(equation 7)}$$

In this connection it should be noted that summation of the image data pieces may be done by the detector 140 collecting input radiation for the entire exposure time (i.e. exposed to input radiation during collection through all of the aperture arrays) and providing a "combined" readout of exposure, or by the image processing module 180 determining a sum of the image data piece provided by the detector 140.

The sum of individual effective transmission function of all the aperture arrays, together with corresponding exposure times provides a total effective transmission function (TETF):

$$G(u, v) = \sum_{l=1}^{L} F^{(l)}(u, v) \cdot t_l \quad \text{(equation 8)}$$

Thus, according to the present invention, the set of aperture arrays is selected such that the total effective transmission function G (u, v) provides non-null transmission for spatial frequencies up to a predetermined limit. Such predetermined limit is determined by the maximal resolution obtained by radiation collection with a single pinhole of corresponding diameter. More specifically, the aperture arrays/masks and corresponding exposure times are selected to provide:

$$G(u,v) \neq 0 \, \forall (u,v) \in \{|u| < u_{max}, |v| < v_{max}\} \quad \text{(equation 9)}$$

Therefore, the total effective transmission function is determined in accordance with the aperture arrays used by the imaging system 100 and corresponding exposure times.

Thus, the image processing module 180 can determine restored image data indicative of the region of interest in accordance with:

$$S(u, v) = \left[\sum_{l=1}^{L} S_{array}^{(l)}(u, v) \cdot t_l\right] \cdot G(u, v)^{-1} \quad \text{(equation 10)}$$

To determine the image data in spatial coordinates system the image processing module can determine an inverse Fourier transform. It should be noted that G (u, v)$^{-1}$ may be determined by any suitable algorithm. Generally linear matrices may be used for image reconstruction. To this end Weiner deconvolution algorithms may also be used to determine G (u, v)$^{-1}$.

Generally speaking, the sum of intensity maps of the image data pieces is determined, and then a distortion effect, caused by the total effective transmission function, is inverted to thereby generate the restored image data Wiener deconvolution is used for correction of noise addition to a convolution based problem. Generally, given a system y(r)=h(r)*x(r)+n(r), where * is convolution operator, x(r) is the input signal (generally image data of the region of interest), h(r) is the impulse response of the system, n(r) is an unknown signal such as noise and y(r) is the observed/measured signal. It should be noted that as the present technique related to spatial domain, the Wiener algorithm is described herein using spatial coordinates defined by r.

The Wiener deconvolution is generally used to identify an operator $g^{-1}(r)$ providing an estimation $\hat{x}(r)=g^{-1}(r)*y(r)$ such that $\hat{x}(r)$ is an estimation of x(r) minimizing the mean square error. In the frequency domain the Wiener deconvolution algorithm provides:

$$G^{-1}(f) = \frac{H^*(f)S(f)}{|H(f)|^2 S(f) + N(f)} \quad \text{(equation 11)}$$

where $G^{-1}$ and H are Fourier transform of $g^{-1}$ and h in the frequency domain f(spatial frequency), S(f) is the mean power spectral density of x(r) and N(f) is the mean power spectral density of the noise n(r). In this connection it should be noted that $G^{-1}$ as describe herein in equation 11 refers to the inverse effective transmission function according to the present technique and thus the (−1) superscript is used herein, differently than the general terms of wiener algorithm.

Also, as indicated above, the set of aperture arrays is selected to satisfy the condition that total effective transmission function is non-null for spatial frequencies within the desired resolution limits. As known from various de-convolution algorithms, zero (or close to zero) values of the effective transmission function may cause amplification of noise in the restored image data and reduce the signal to noise ratio.

Figure 7:
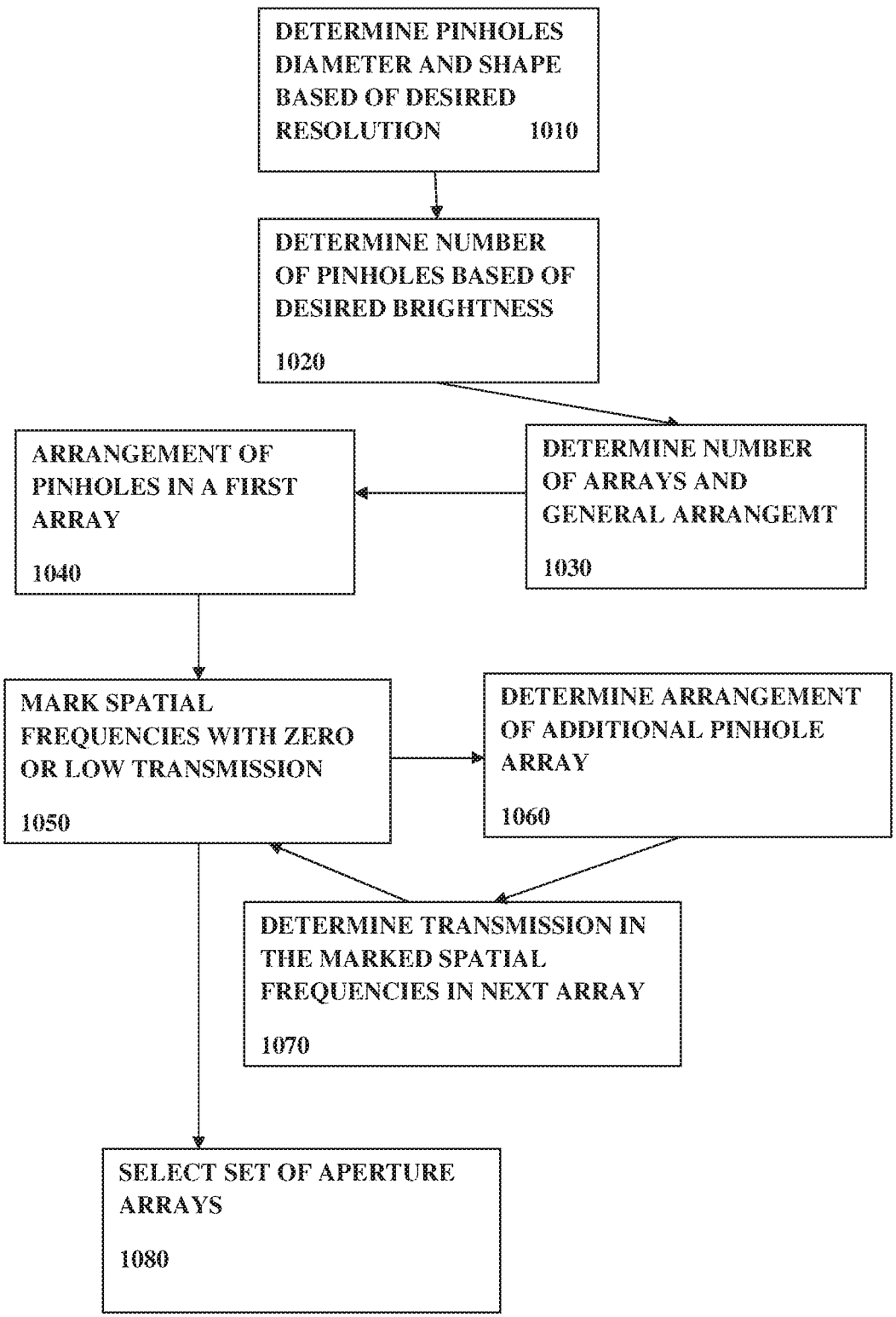
FIG. 7 is a block diagram exemplifying a method for selection of pinhole arrays according to the present invention.

Reference is made to FIG. 7 exemplifying a method for selection of the set of aperture arrays for use in the imaging system 100. Initially the desired parameters of the system need to be determined. The resulting image resolution is determined (step 1010) in accordance with a diameter of the apertures, together with distance from mask to the detector F, from the objects to the mask Z and the wavelength of radiation used as described above with reference to equation 2. In some configurations, a minimal aperture diameter may be selected to define the desired resolution and one or more additional, larger diameters may be selected to further increase image brightness. At a next design step (1020), a desired energy transmission is determined. The energy transmission may be determined as a factor of improvement with respect to a single pinhole system, or with respect to a standard optical imaging system. The energy transmission can be presented as Radiation Intensity Improvement (RII) factor which is used to determine the number of apertures in the arrays and the number of arrays used. The maximal RII can be determined for equal accumulation time by the ratio:

$$RII = \frac{N}{L} \cdot \frac{\pi R_1^2}{\pi R_{single}^2} \qquad \text{(equation 12)}$$

where N is the total number of apertures used, L is the number of arrays, $R_1$ is the radius of the apertures in the arrays and $R_{single}$ is the radius of a corresponding single pinhole system used in comparison. The energy transmission is determined in accordance with detector sensitivity and appropriate accumulated exposure time.

At this stage a general decision about number of aperture arrays and arrangement of the apertures in each array is to be made (1030). For example, for desired RII of 2, two aperture arrays may be used each having two apertures along an axis. Generally the number of aperture arrays is selected to be as low as possible while providing the desired condition of equation 9. Additionally, the aperture arrangement in each array may be 1-dimensional, i.e. apertures arranged along an axis, or 2-dimensional.

In step 1040 an aperture arrangement for the first array is determined. It should be noted that the order of selection of the arrays is of no importance at the imaging session. Generally the aperture arrangement of the first array may be determined arbitrarily, however generally a simple arrangement of one aperture at the center of the radiation collection surface and one aperture at certain distance therefrom along a selected axis may be preferred. Generalization to two dimensional arrangements may be done by copying 1-dimensional arrangement along a second axis and/or rotation of such 1-dimensional arrangement.

Once a first aperture array is selected, the corresponding effective transmission function is determined and the "problematic" spatial frequencies are marked (1050). As indicated above, the effective transmission function is determined in accordance with equation 6 and the marked "problematic" spatial frequencies satisfy $F^{(l)}(u_1, v_1)=0$ or under a predetermined threshold (e.g. below 0.1). It should be noted that such spatial frequencies are marked only within the resolution limits defined by the aperture diameter.

At this stage, additional aperture arrays may be determined (1060), the number and diameter of apertures is selected in accordance with desired resolution and energy transmission, while the arrangement of the apertures is determined to provide finite values of the corresponding effective transmission function for the spatial frequencies marked for the previous array(s) (1070). This process may be performed for two, three or more aperture arrays until an appropriate set of aperture arrays is selected (1080).

It should be noted that the set of aperture arrays may be pre-selected for design and assembly of the imaging system. Alternatively, the processor unit 160 of imaging system 100 may further include a set selection unit (190 in FIG. 2) configured to determine an appropriate set of aperture arrays in accordance with input parameters about desired resolution and energy transmission. Generally, the former method is suitable for use with pinholes punctured into a radiation blocking mask, while the later is more suitable of use with electronically controlled varying patterned mask 120.

Additionally, the selection of an appropriate set of aperture array is configured to optimize the transmission of the aperture arrays for different spatial frequencies. To this end, the selection process may also include determining an estimated total effective transmission function, assuming equal exposure times for all aperture arrays. The estimated effective transmission function may then be compared to a Pinhole Transmission Function (PTF). Generally the set of aperture arrays is selected to optimize transmission of spatial frequencies with the resolution limits to thereby optimize imaging of the region of interest. To this end the aperture arrays, as well as corresponding exposure times are selected such that for at least some spatial frequencies within the desired resolution limits, the total effective transmission function provides transmission that is greater than that of the PTF.

Figure 8:
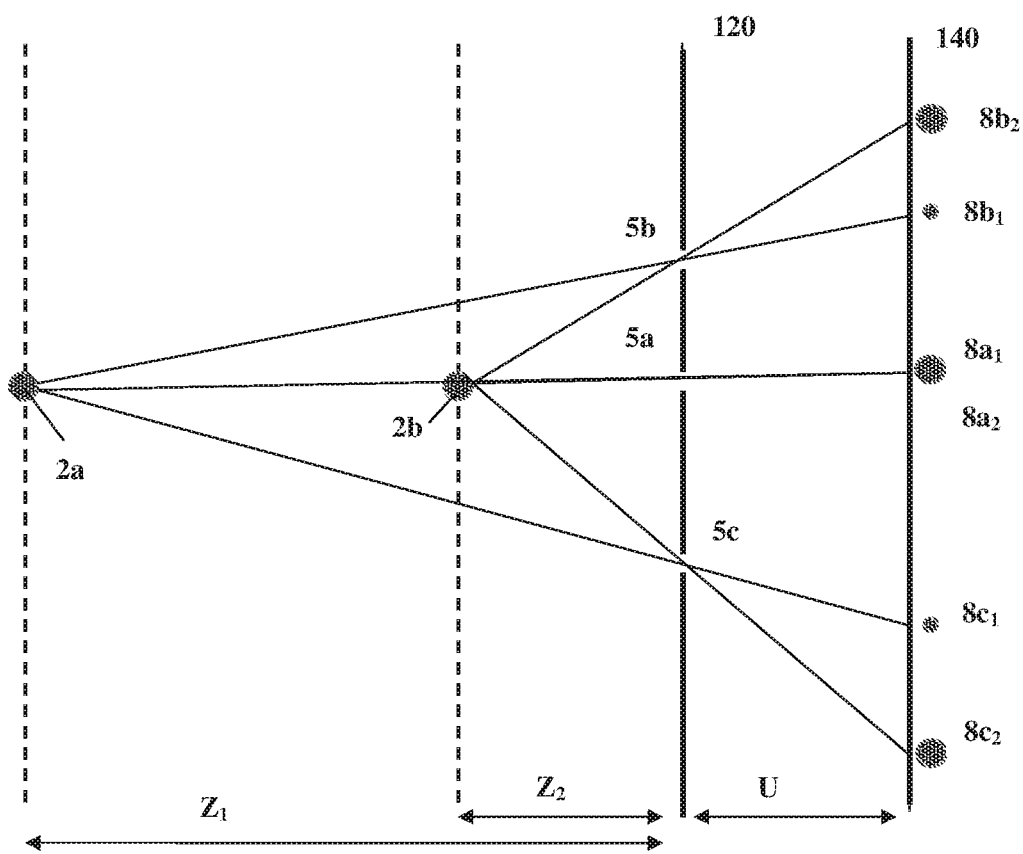
FIG. 8 exemplifies how three-dimensional information about a region of interest can be provided by the technique of the present invention.

The above described technique can also be utilized for acquiring 3-dimensional image data. More specifically, the technique allows obtaining of image data pieces from a region of interest and to determine depth information from the acquired image data pieces. Reference is made to FIG. 8 illustrating imaging of objects located at different distances from the imaging system 100 and determining of depth information. As shown in the figure, objects located at different distances from the imaging system 100, or from the patterned mask 120 thereof, generate different images on the detector. This is due to the multiplicity of apertures in each aperture arrays. Generally, if the distance Z between the object and the patterned mask is of the order of the distance between the apertures of the two or more apertures arrays used for imaging, images thereof taken through two or more separate pinholes provide a stereoscopic like image data pieces. More specifically, as shown in FIG. 8 objects 2a and 2b, located respectively at distances $Z_1$ and $Z_2$ from the imaging system actually see the different apertures of the array in different angular directions. Thus, radiation propagating from object 2a and passing through the topmost pinhole 5b reach the detector 140 to generate an image 8a₁. This is while radiation propagating from object 2b and passing through the same pinhole 5b generates an image 8a₂ at a slightly different location on the detector 140. This effect may be considered as a result of varying magnification M for different objects in accordance with equation 1 above.

To this end, the processor unit 160 of the imaging system 100 may utilize predetermined information about expected distances of objects within the region of interest as well as desired depth resolution to determine different effective transmission functions in accordance with the different distances. Such 3-dimensional information is typically more effective in near-field imaging as described above, however it should be noted that depth information may be determined based on image data pieces acquired by the system of the present invention even in the far-field.

The processor unit 160 may thus include a depth resolving pre-processor 195 configured to determine variation of the effective transmission function in accordance with desired depth resolution to be extracted from the image data pieces. However, effective transmission function data corresponding to depth resolving of the imaging system may be pre-configured and provided to the system, e.g. stored in a corresponding storage unit.

Generally, to provide depth information, the effective transmission function may be determined for different locations of an object with respect to the patterned mask 120. If the actual locations of the apertures in an aperture array are described by $d_{n\text{-}actual}$, defined for a pre-selected magnification factor M=0 as defined in equation 1 (i.e. reference object plane at infinity), for objects located at different Z distances from the mask and having magnification $M=M_1$ the effective locations of apertures in the array are viewed as $$d'_n = (1+M_1)d_n \qquad \text{(equation 13)}$$

Thus, a new effective depth transmission function $F^{(l)}{}_Z(u, v)$ can be defined for each array and each distance Z, as well as a new total effective depth transmission function $G'_Z(u, v)$.

After collection of image data pieces onto the detector 140, the image processing module 180 may utilize the depth resolved effective transmission functions provided by the depth resolution pre-processor 195 to determined plurality of restored image data sets, each indicative to object distance Z in connection with the corresponding effective transmission function G'$_Z$(u, v) for the distance. Thus, the image processing module generates plurality of restored image data elements as follows:

$$S_{Z-min} = \left[\sum_{l=1}^{L} S_{array}^{(l)}(u, v) \cdot t_l\right] \cdot G'_{Z-min}(u, v)^{-1} \quad \text{(equation 14)}$$

$$\vdots$$

$$S_{Z-max} = \left[\sum_{l=1}^{L} S_{array}^{(l)}(u, v) \cdot t_l\right] \cdot G'_{Z-max}(u, v)^{-1}$$

It should be noted that the number of Z planes obtained by corresponding effective depth transmission functions G'$_Z$(u, v) determine the depth resolution. Additionally, the maximal possible depth resolution is determined by rules of triangulation and in accordance with geometrical resolution of the detector unit 140. In this connection, variation of the distance of an object from the mask can be detected if an image generated by radiation transmission through at least one of the apertures in at least one aperture array shifts by at least one pixel with respect to a distance of a reference object plane. This condition provides that $$d'_{n(Z-max)} = Z_{max} + U Z_{max} \cdot d_{n(actual)} \geq 1 pixel_{x,y} \quad \text{(equation 15)}$$

More specifically, the variation in relative location of the apertures as seen from different (in this case maximal) depth locations is larger than the spacing between pixels of the detector. Additionally, a similar condition may be provided for differentiating between depth locations yielding:

$$\Delta d'_{n(Z-planes)} = d'_{n(Z_1-planes)} - d'_{n(Z_2-plane)} = \quad \text{(equation 16)}$$
$$\frac{Z_2 - Z_1}{Z_1 \cdot Z_2} \cdot U \cdot d_{n(actual)} \geq 1 pixel_{x,y}$$

It should be noted that, in the case of depth information, the image processing unit 180 is configured to reconstruct image data for each of the Z-planes. For each reconstructed data only objects located in the corresponding Z-plane will be accurately reconstructed providing in-focus image data. Objects located in other Z-planes will provide blurry reconstructed image data similar to 'out-of-focus' image data.

The following exemplify the use of the technique and system of the present invention in imaging.

EXAMPLE 1

Figure 6A:
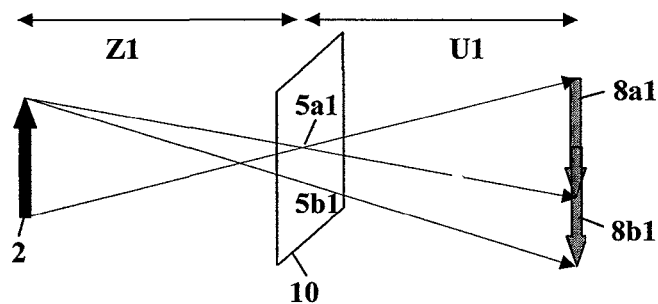
FIGS. 6A-6F show schematically the principles of the configuration and operation of the set of aperture arrays according to yet another embodiment of the invention.
Figure 6B:
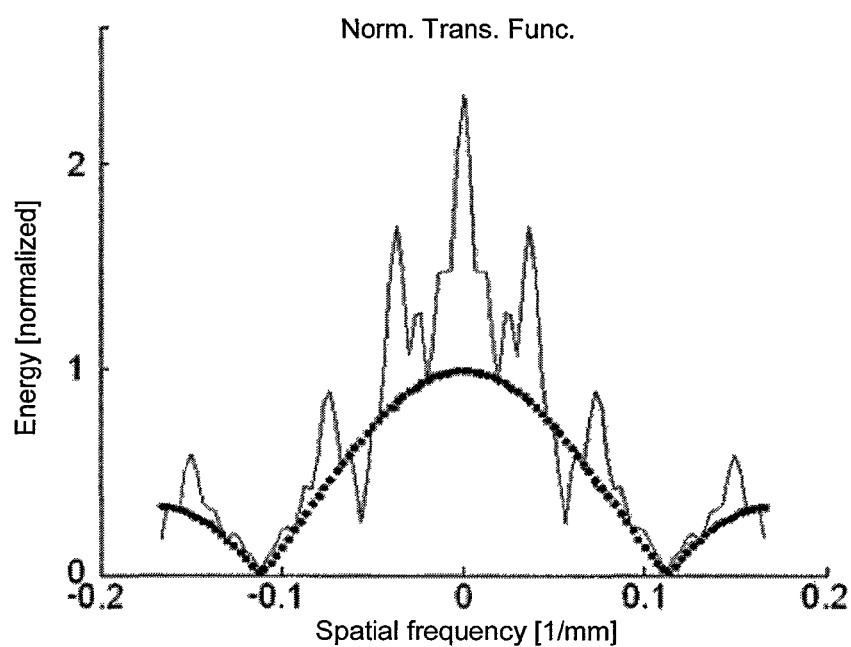
Figure 6C:
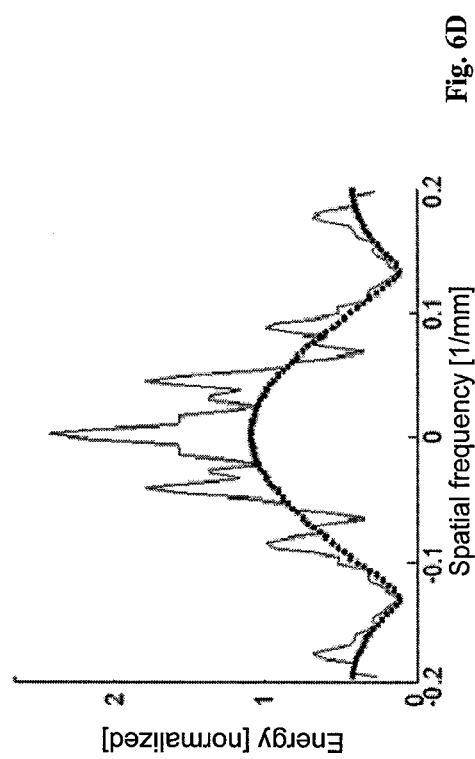
Figure 6D:
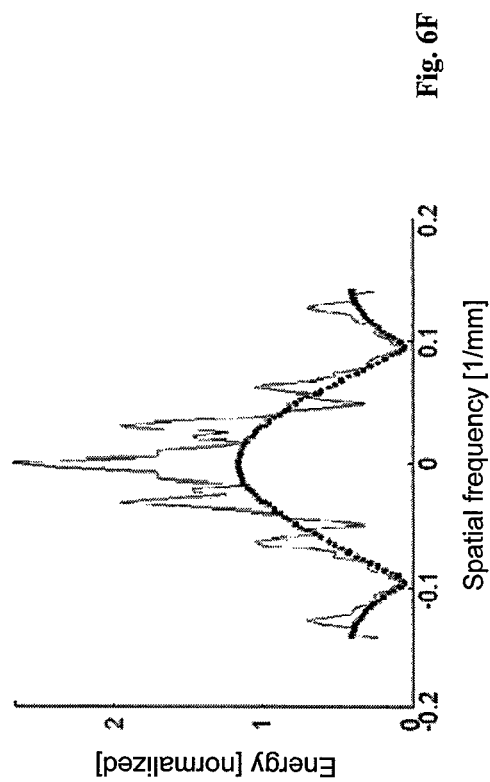
Figure 6E:
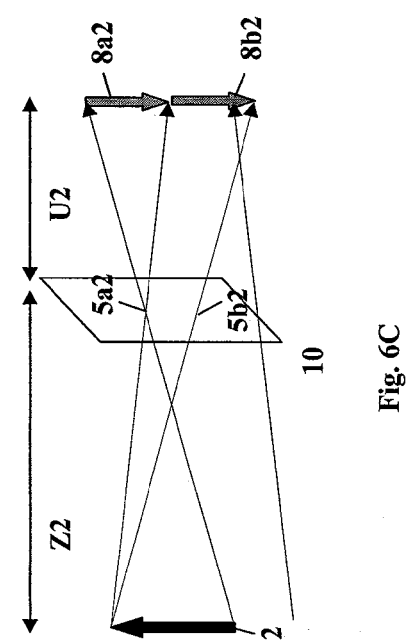
Figure 6F:
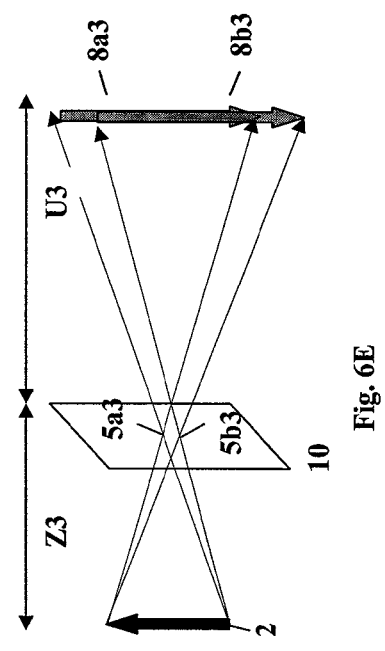
Figure 9E:
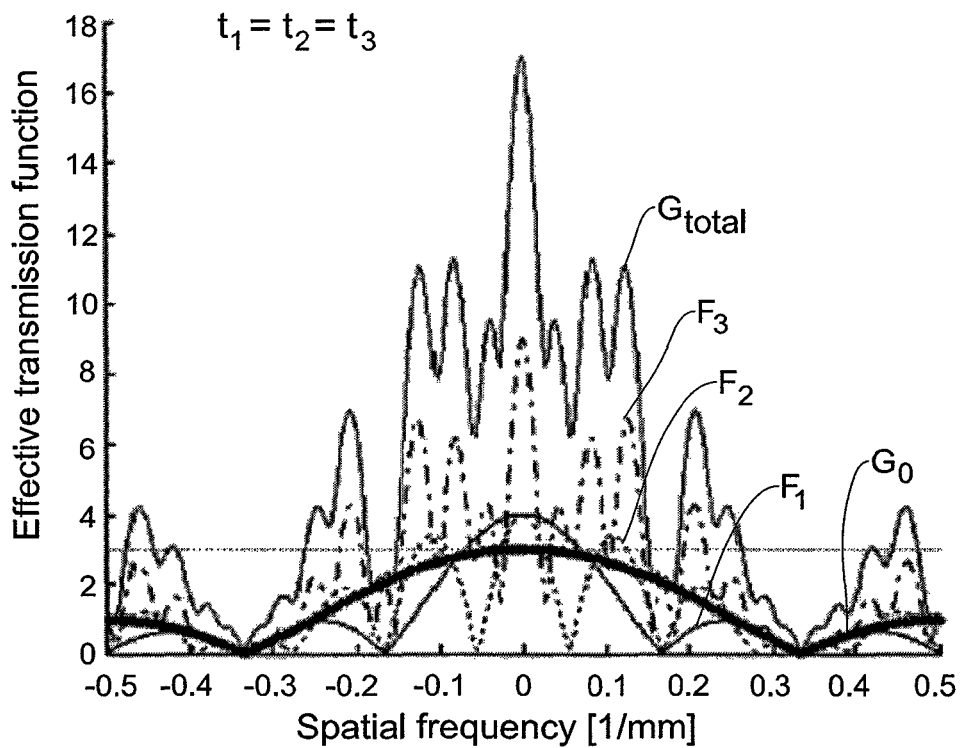

FIGS. 9A-9K show three aperture arrays, corresponding effective transmission functions and images of a test object. FIG. 9A-9C show aperture configuration of three aperture arrays having pinholes of diameter 170 μm; FIG. 6D illustrates the locations and numbering of the apertures. The set of aperture arrays is selected to provide 5.66 brighter imaging relative to a single pinhole of similar diameter. The locations of the apertures in the three arrays of FIGS. 9A-9C are shown in table 1 in relative units determined in accordance with pixel size of the detector and distances in the system (i.e. U and Z).

TABLE 1

| Location (x, y) [relative units] | Location # | Hole # |
|---|---|---|
| (0, 0) | 1 | 1, 5, 9 |
| (1, 0) | 2 | 2 |
| (1, 1) | 3 | 3 |
| (0, 1) | 4 | 4 |
| (3, 0) | 5 | 6, 10 |
| (3, 3) | 6 | 7, 11 |
| (0, 3) | 7 | 8, 12 |
| (-6, 3) | 8 | 13 |
| (-6, 0) | 9 | 14 |
| (-6, -6) | 10 | 15 |
| (0, -6) | 11 | 16 |
| (3, -6) | 12 | 17 |

Figure 9F:
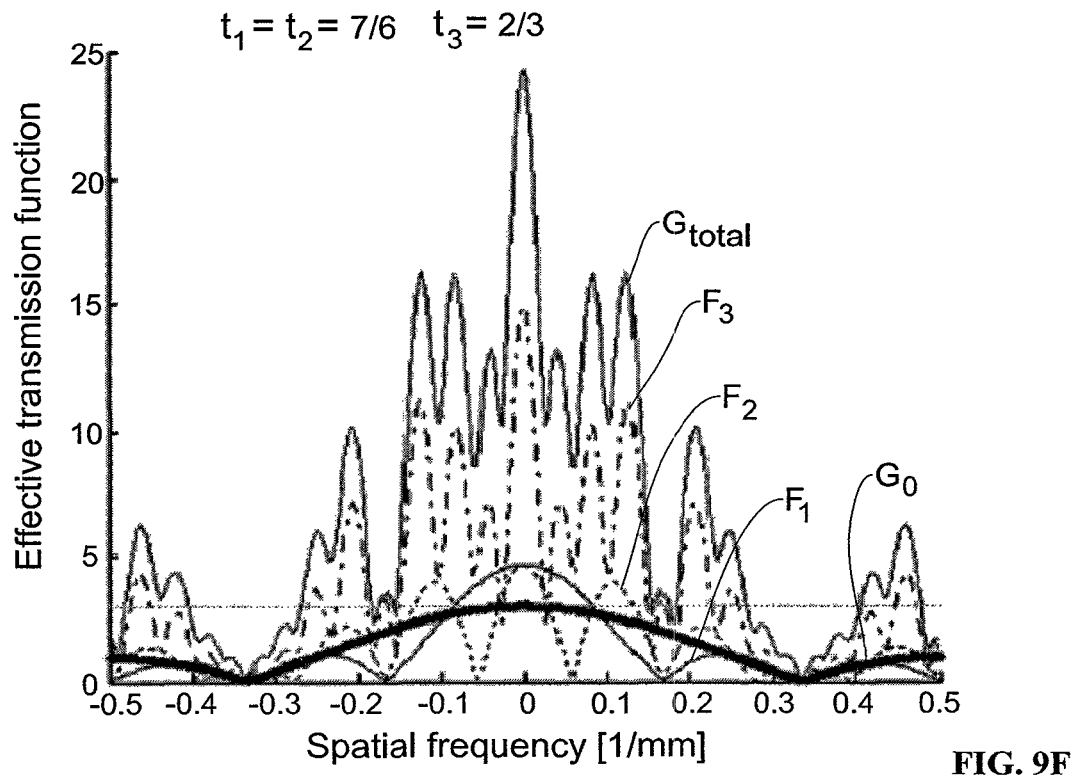

As shown, apertures 1, 5 and 9 are located at the center of the mask and the rest of the apertures are arranged around to provide non-null effective transmission function. FIGS. 9E and 9F illustrate the absolute values of the effective transmission functions for each aperture array and the total effecting transmission function based on selected exposure time weights. As shown in FIGS. 9E and 9F, graph line G$_0$ shows the transmission function of a single pinhole located at the center of the mask and having similar dimension. Graphs F$_1$, F$_2$ and F$_3$ show the effective transmission function of aperture arrays of FIGS. 9A-9C respectively. As can be seen from the figures, the effective transmission function of a single pinhole is in the form of sinc($f$) function having a main lobe defining the resolution limits. Aperture array of FIG. 9A has several zero points while aperture arrays of FIGS. 9B and 9C are designed to have zero values at different spatial frequencies in order to provide the total effective transmission function G$_{total}$ with non-null values for spatial resolutions within the resolution limits. It should be noted that the aperture arrays shown here are actually configured as replications of a one-dimensional array and thus the effective transmission function can be fully described in a 1D graph.

Figure 9G:
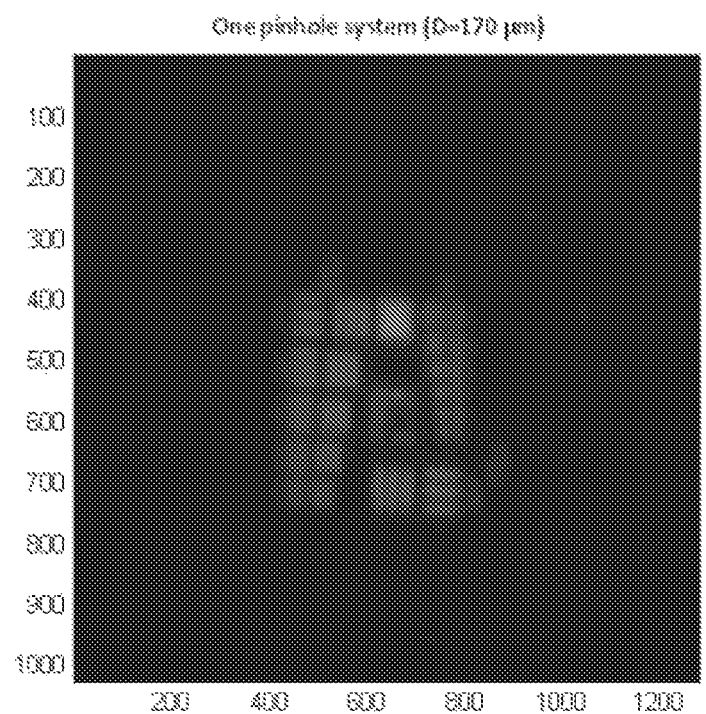
Figure 9H:
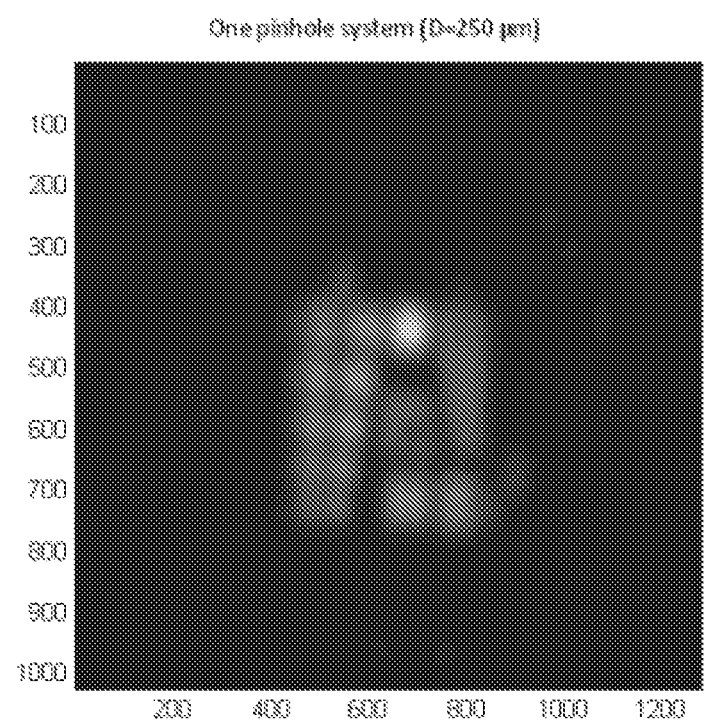
Figure 9I:
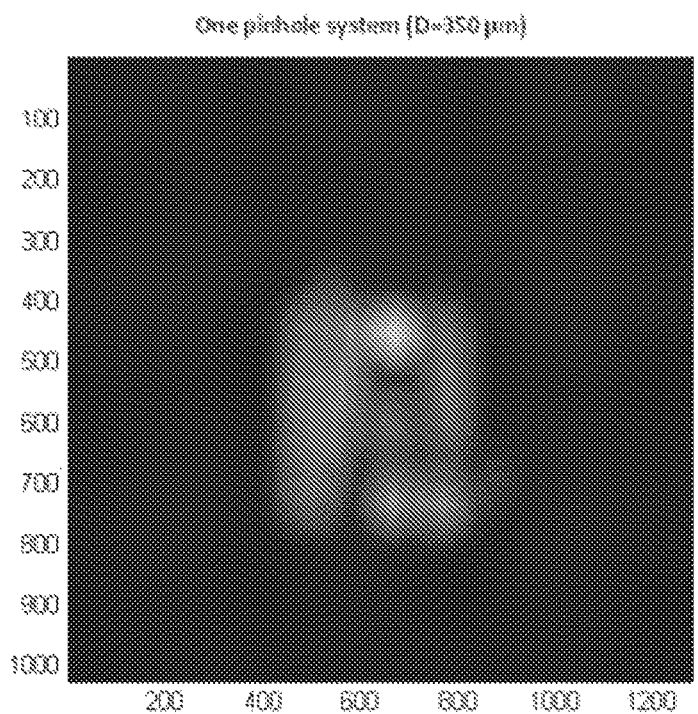
Figure 9J:
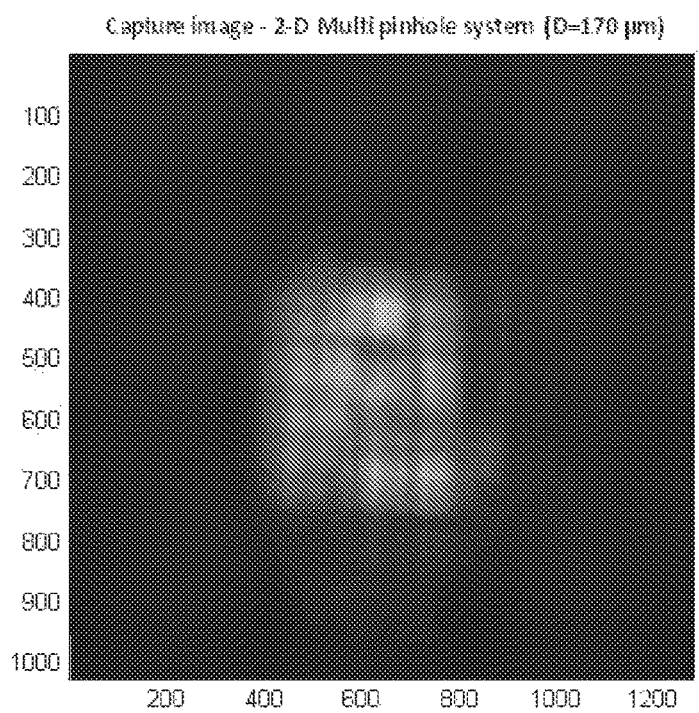
Figure 9K:
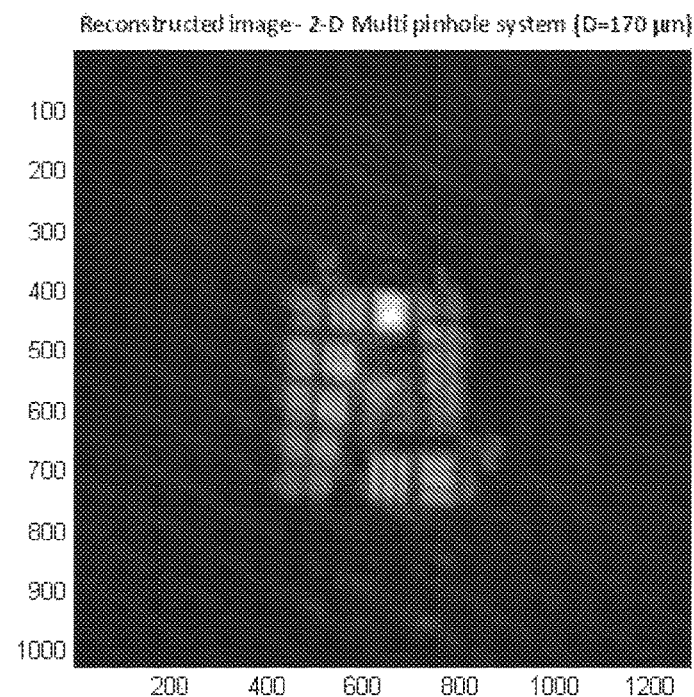

FIGS. 9G to 9K show experimental results illustrating the efficiency of the above described technique. FIG. 9G shows image of a test object taken with visible light through a single pinhole of diameter of 170 μm; FIG. 9H shows an image of the same object through a pinhole of diameter of 250 μm; FIG. 9I shows an image of the object through a pinhole of diameter of 350 μm; FIG. 9J shows raw image data generated after sequential exposure through the three aperture arrays of FIGS. 9A-9C without post-processing; and FIG. 9K shows reconstructed image after post-processing.

As shown, increasing the pinhole diameter increases the image brightness but decreases resolution. This is while the reconstructed image generated in accordance with the above described technique provides higher image brightness with no reduction of resolution and thus provides greater signal to noise ratio.

EXAMPLE 2

Figure 10A:
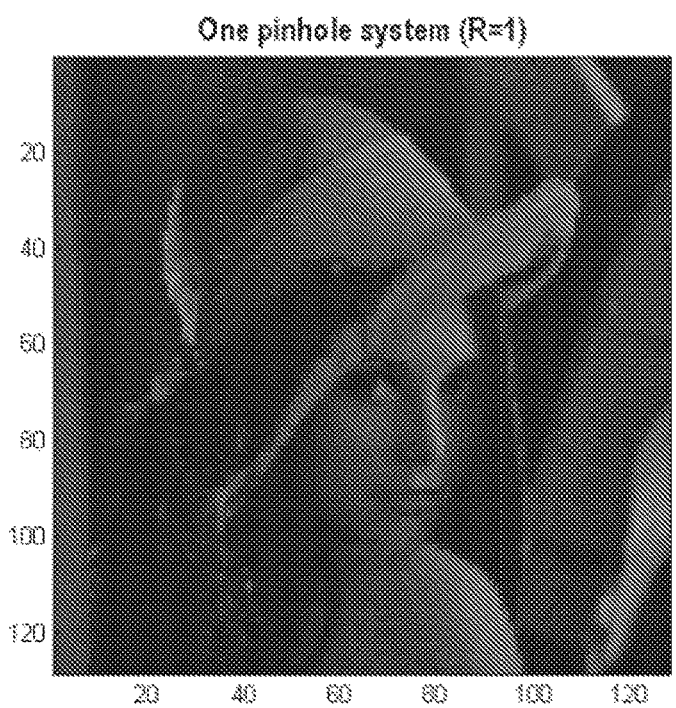
FIGS. 10A-10E show additional simulation results of imaging an object based on the technique of the invention.
Figure 10B:
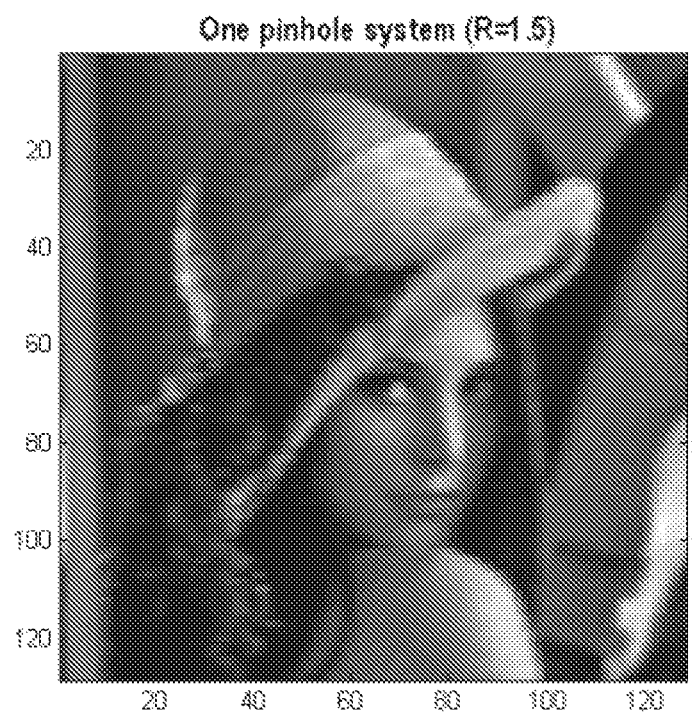
Figure 10C:
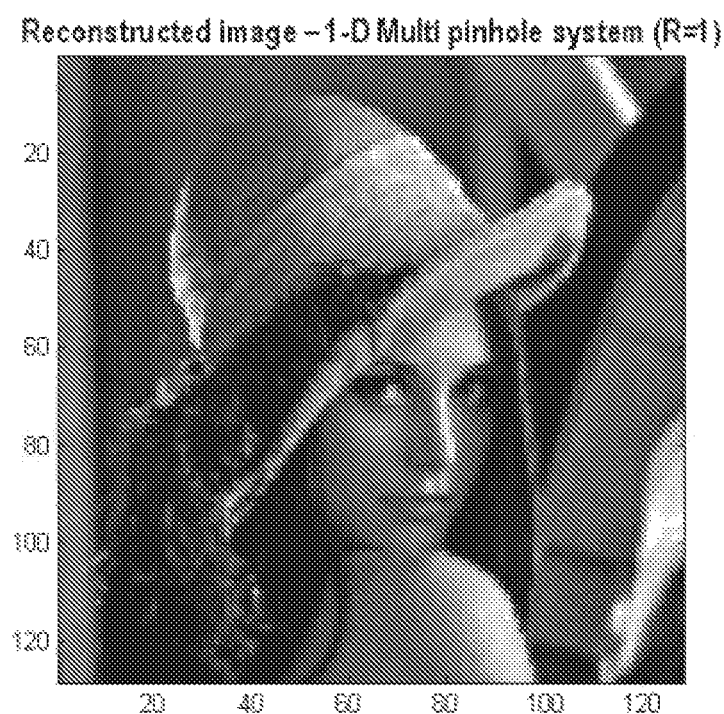
Figure 10D:
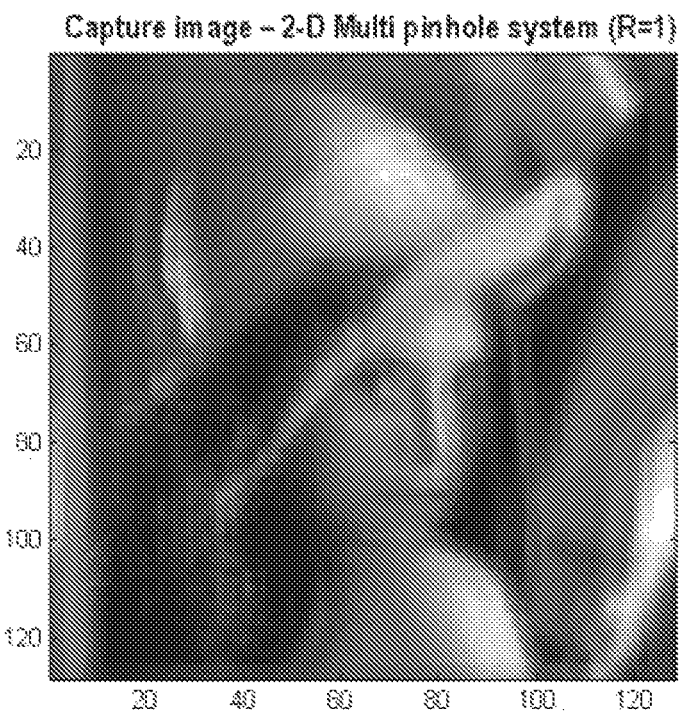
Figure 10E:
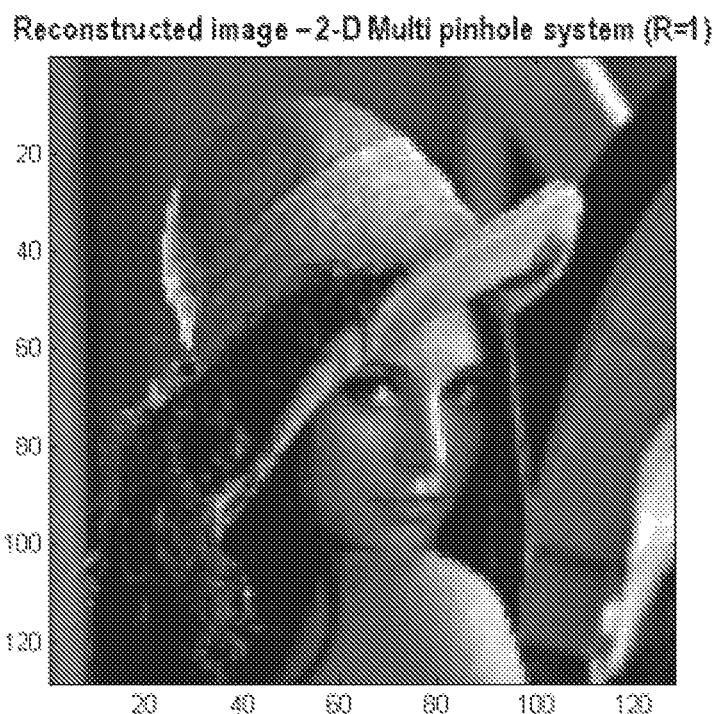

FIGS. 10A-10E show image data of simulation results using one-dimensional and two-dimensional aperture arrays configured as exemplified in FIGS. 9A-9C. The one-dimensional aperture arrays were configured with aperture locations including apertures 1, 2; 5, 6; and 14, 9, 10 as exemplified in FIG. 9D and provide image brightness increase of 2.33. FIG. 10A shows an image taken through a single pinhole of similar diameter; FIG. 10B shows a similar image taken through a pinhole diameter bigger by 150%; FIG. 10C shows reconstructed image taken in accordance with the above described technique utilizing one-dimensional aperture arrays; and FIGS. 10D and 10E show respectively raw image data and reconstructed image taken in accordance with the multi aperture technique utilizing two-dimensional aperture arrays.

As shown, increasing the aperture diameter increases image brightness at cost of resolution. This is while the reconstructed images according to the present invention provide increased brightness with no reduction in resolution. Additionally, this technique allows for use of smaller apertures thereby increasing the resolution for similar or greater image brightness.

EXAMPLE 3

Figure 11A:
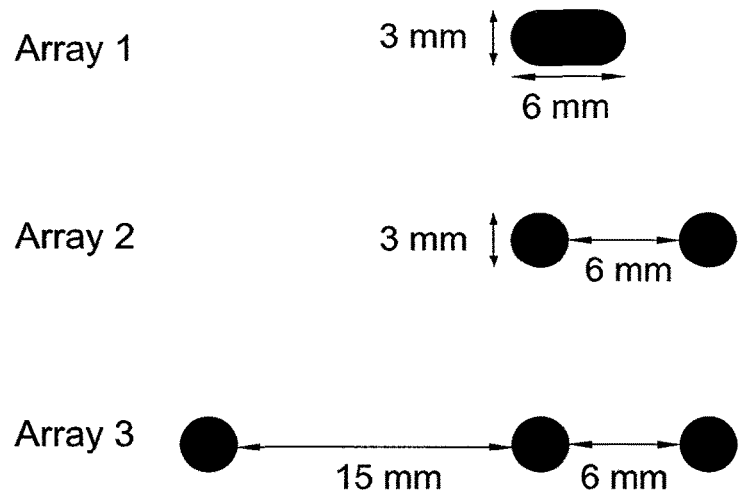
FIGS. 11A-11J show a set of one-dimensional pinhole arrays and simulation of Gamma radiation imaging through such set based on the technique of the invention.
Figure 11B:
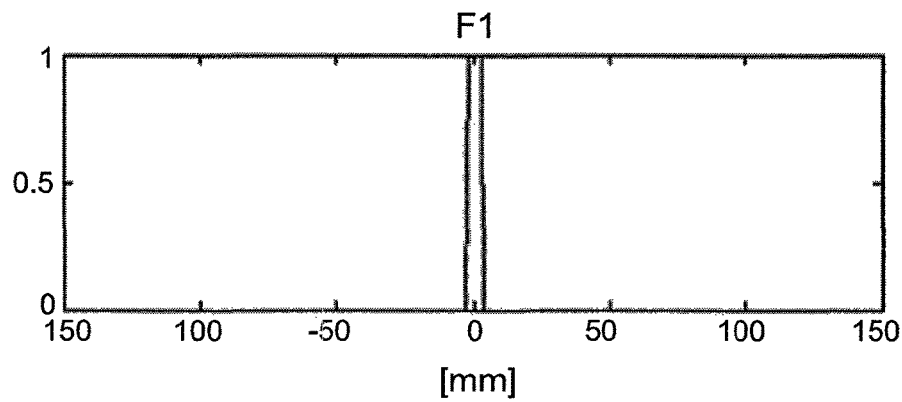
Figure 11C:
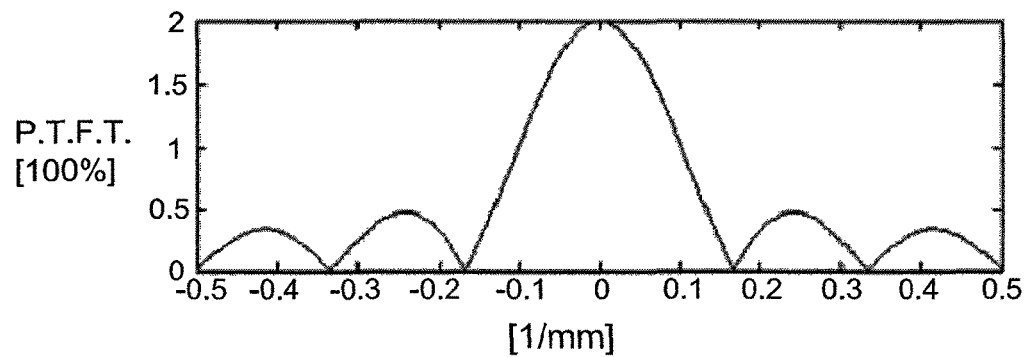
Figure 11D:
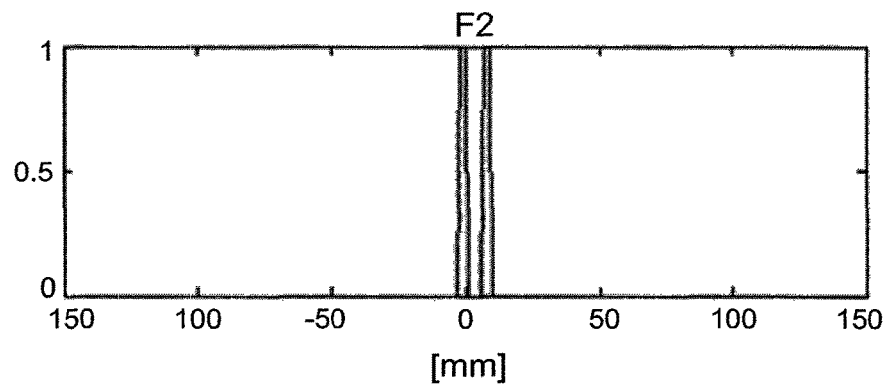
Figure 11E:
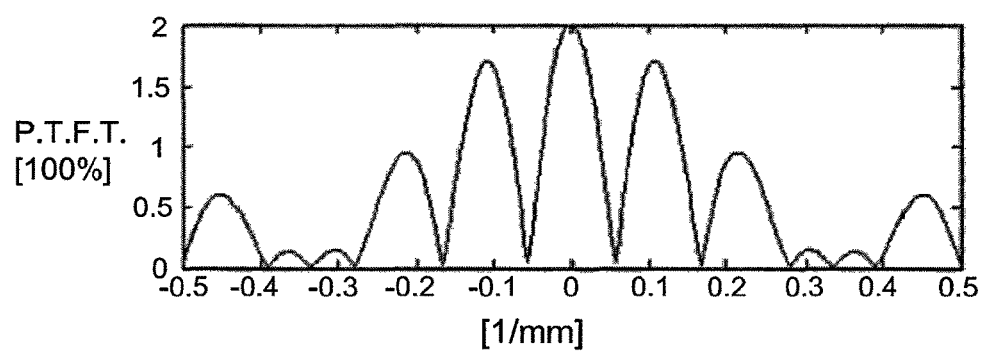
Figure 11F:
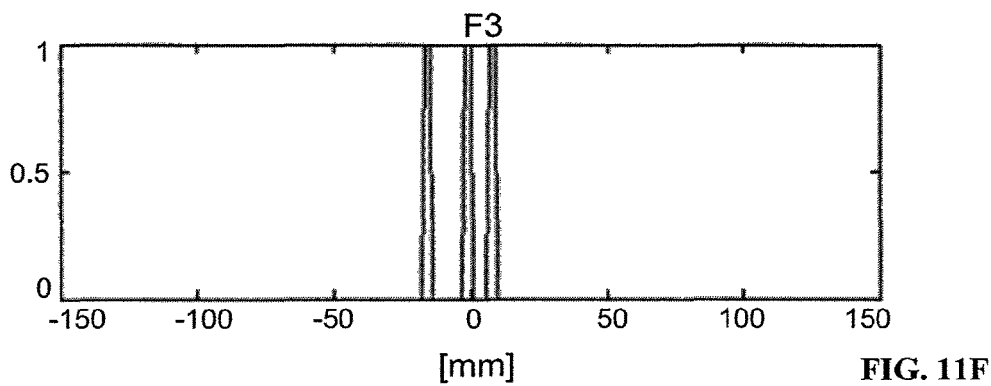
Figure 11G:
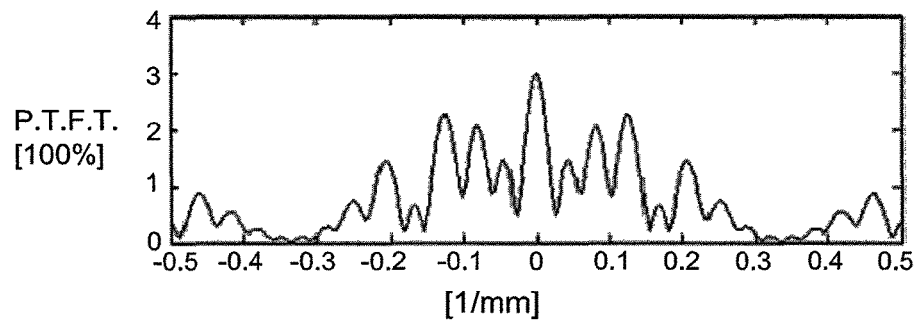
Figure 11H:
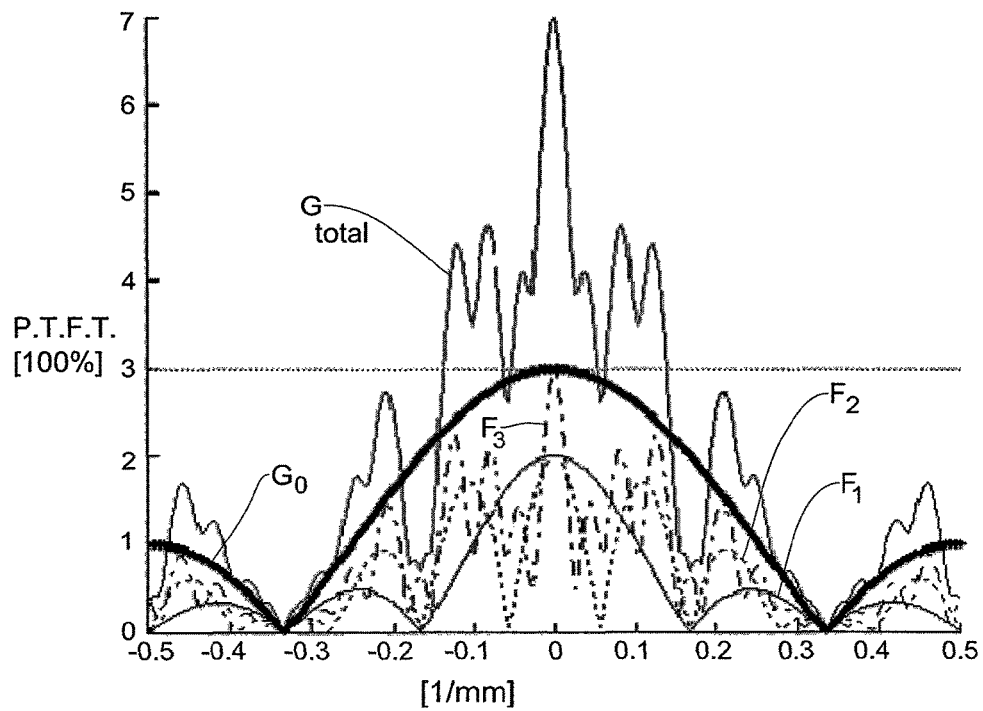
Figure 11I:
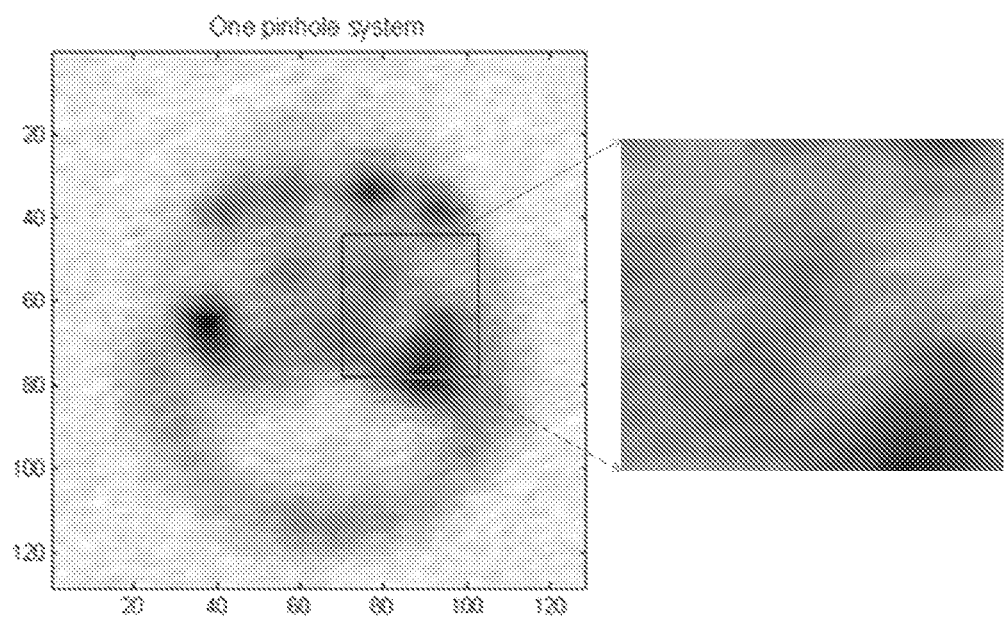
Figure 11J:
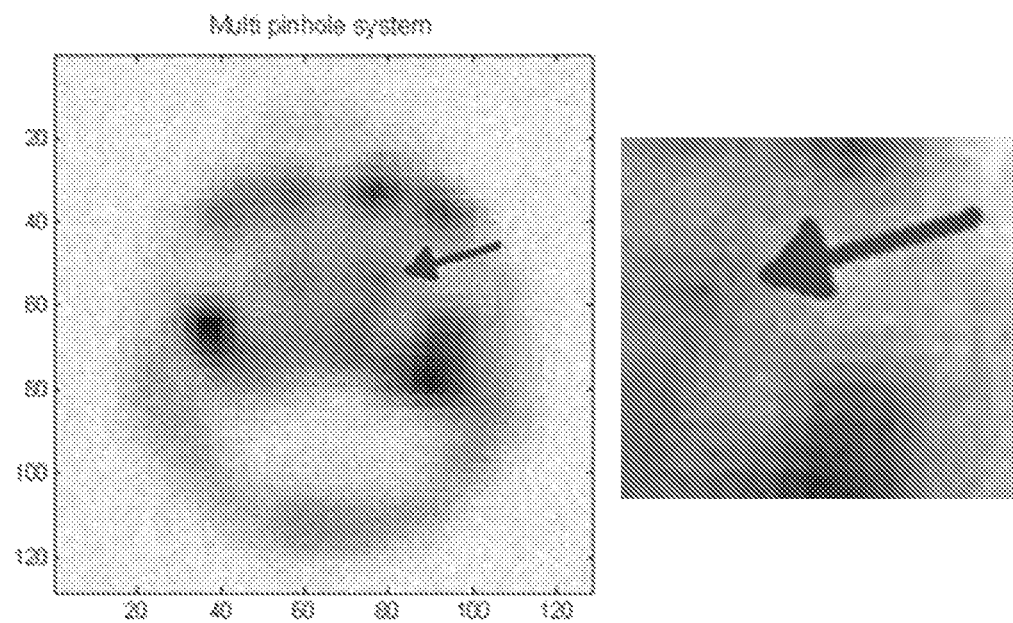

FIGS. 11A-11J illustrates simulation of Gamma imaging using the technique of the present invention. FIG. 11A shows the structure of arrays 1-3 and corresponding aperture dimensions; FIGS. 11B-11G show graphs of the arrays and corresponding effective transmission functions; FIG. 11H shows a single pinhole transmission as well the separate and total effective transmission functions of the arrays; and FIGS. 11I-11J show simulated images for imaging using a single pinhole (FIG. 11I) and reconstructed image (FIG. 11J) utilizing the technique of the invention with the pinhole arrays shown in FIG. 11A with conventional simulation techniques emulating bone scan for osteomyelitis transverse slice image (negative colors) using Gallium 67 radiation. Both FIGS. 11I and 11J illustrated a region of the figure in magnification, and as shown, the reconstructed image provides higher resolution and signal to noise ratio and thus provides information on features (marked with an arrow) that cannot be resolved in the image generated by a single pinhole.

The aperture arrays provide brightness increase of 2.33 with respect to a single pinhole system of similar diameter. As shown the aperture arrays are selected such that the total effective transmission function ($G_{total}$ in FIG. 11H) in non-null for spatial frequencies within the resolution limits of the single pinhole dimensions. Table 2 below provides the resulting signal and noise measurements:

of 4.45 mm; FIG. 12B shows imaging of the test object using a single pinhole of diameter of 2 mm; and FIG. 12C shows reconstructed image of the test object utilizing the technique of the invention with a set of aperture arrays as shows in FIG. 12A with pinhole diameter of 2 mm.

As shown the image of FIG. 12A is relatively bright but does not provide sufficient resolution to differentiate between the fine lines in two of the regions of the object. Utilizing a smaller pinhole, in FIG. 12B, increases the resolution, however it limits the image brightness and thus for one of the regions, the brightness of the image is not sufficient in order to recognize the fine lines. This is while the use of the technique of the invention allows to increase the resolution as well as provide sufficient image brightness to identify the fine lines in all in all of the regions of the test object as can be seen in FIG. 12C.

EXAMPLE 5

Figure 13A:
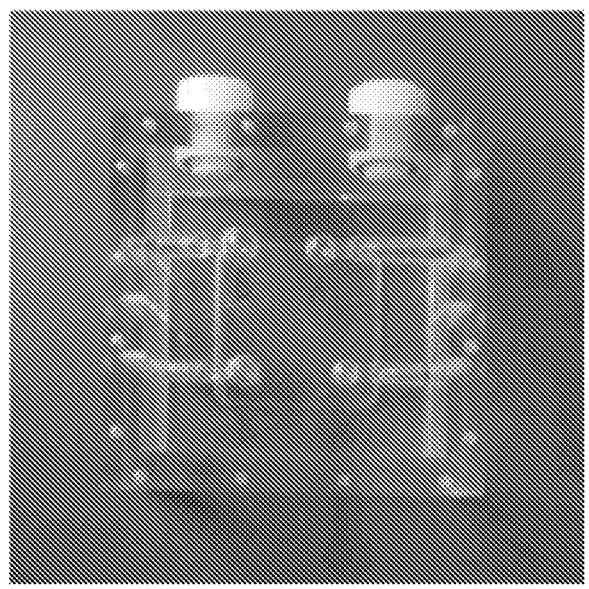
FIGS. 13A-13F show experimental results of three-dimensional imaging using the technique of the invention.
Figure 13B:
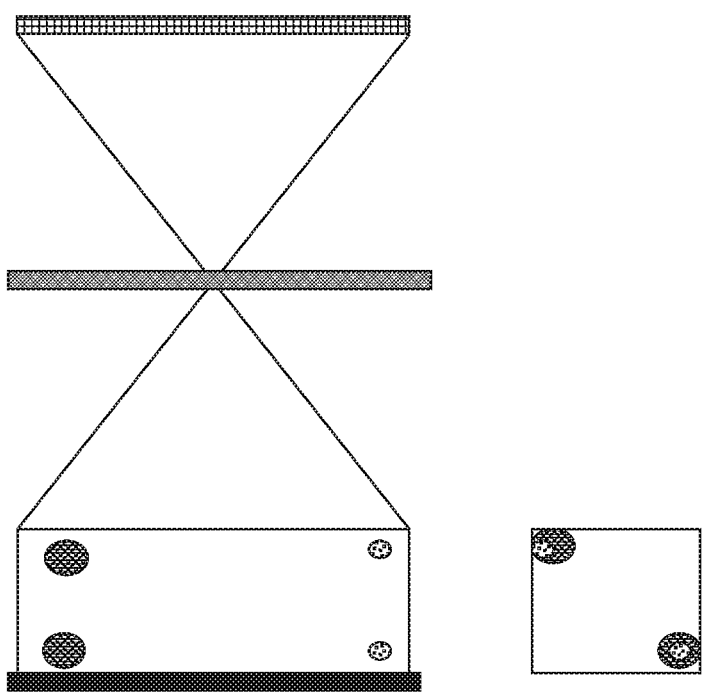
Figure 13C:
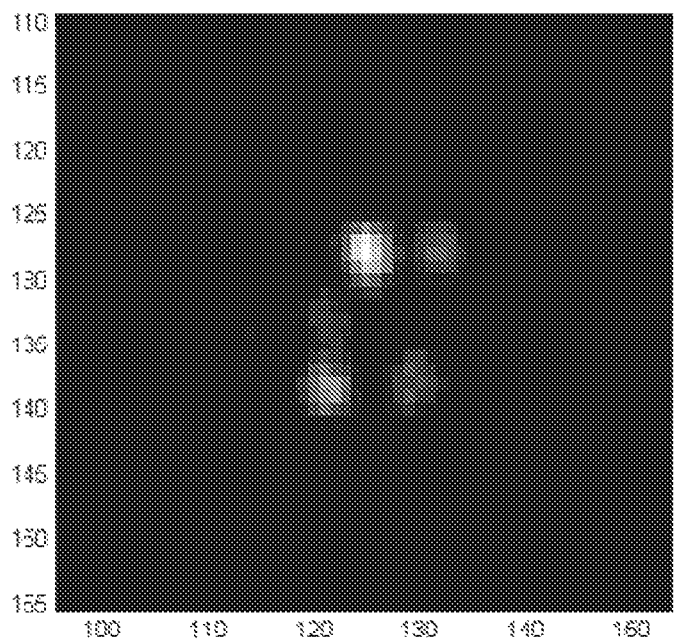
Figure 13D:
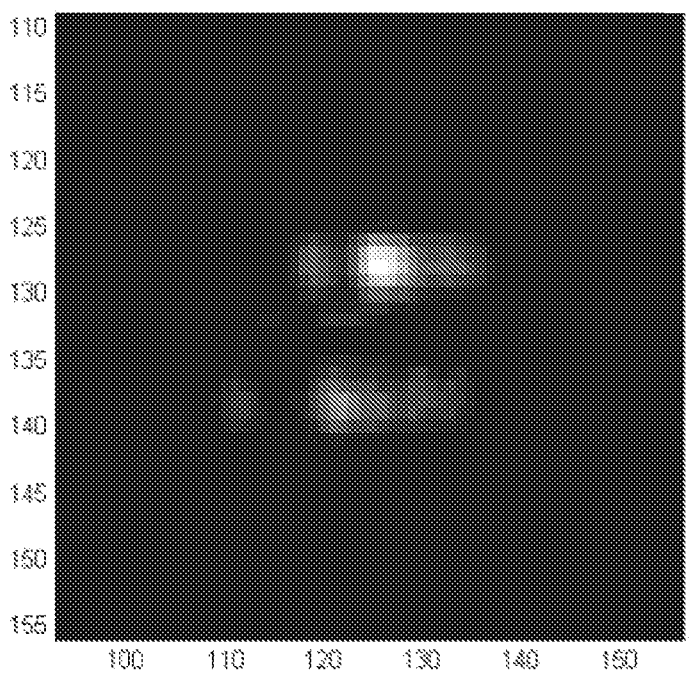
Figure 13E:
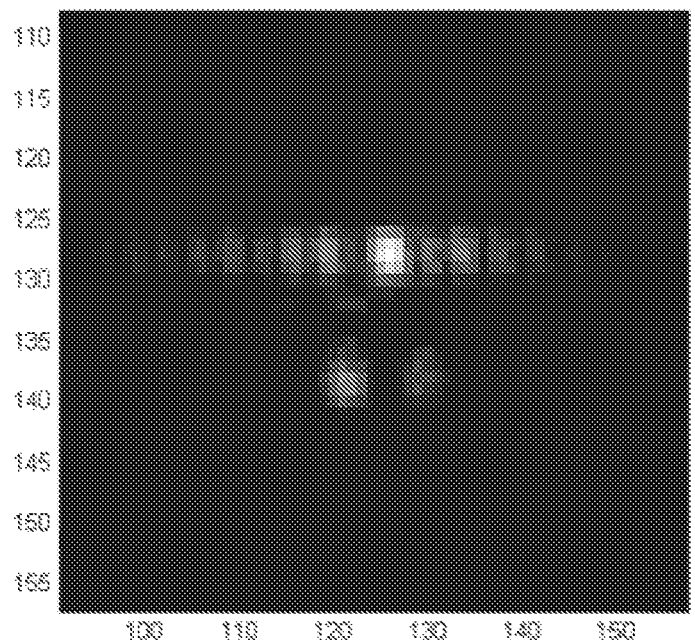
Figure 13F:
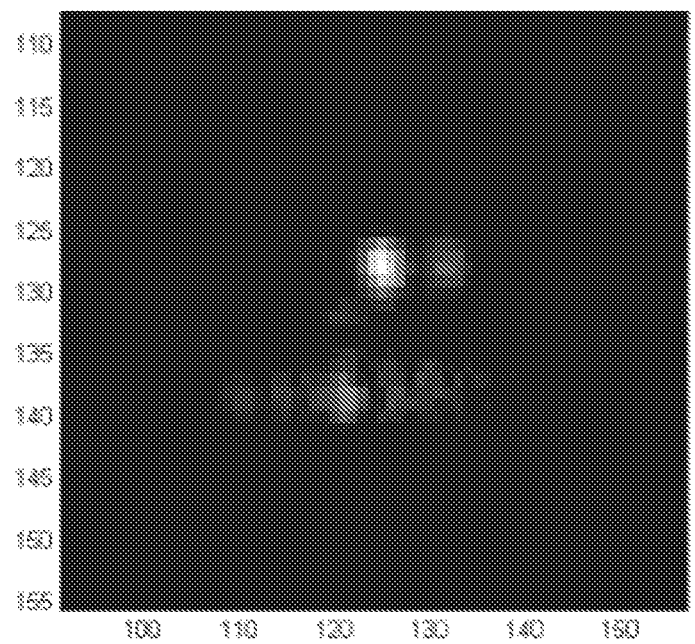

FIGS. 13A-13F show experimental depth resolved imaging based on the above described technique utilizing the aperture arrays of FIG. 11A. FIG. 13A shows a case having four radiation sources of different power located at different distances from the front surface of the case. The distance between the close sources and the further ones is 60 mm FIG. 12B illustrates an imaging scheme and a side view of the sources' locations in the case to illustrate the different locations of the sources. FIG. 12C shows an image of the object as generated by imaging through a single pinhole of 2 mm in diameter. In this image all four radiation sources can be seen with limited resolution and brightness. Additionally this image cannot provide data about distance of the sources with respect to the mask; this is partially due to the high depth of focus (effectively infinite) of pinhole based imaging. FIG. 13D shows a raw image resulting of collecting radiation through three aperture arrays as sown in FIG. 11A. This image is blurry and requires reconstruction to provide meaningful information. Such information is provides in FIGS. 13E and 13F showing image reconstruction results for $Z_{max}$ and $Z_{min}$ distances respectively. The distances are defined in accordance of existing knowledge of thickness of the object being image and desired depth resolution. As shown, in each restored image there are two

TABLE 2

| Object to background ratio | Single pinhole system Accumulation time = 180 sec | | | Multi pinhole arrays Total accumulation time = 180 sec | | |
|---|---|---|---|---|---|---|
| 1:1.2 | Signal | Noise | SNR | Signal | Noise | SNR |
| Object | 13.56837806 | 3.8824886 | 3.49476336 | 31.57960458 | 5.62920882 | 5.60995436 |
| Background | 11.16794390 | 3.34176248 | 3.34193228 | 26.124600000 | 5.16068550 | 5.06223447 |

As shown in Table 2, the signal to noise ratio (SNR) provided by the technique of the invention is significantly higher with respect to a single pinhole system. The improvement is greater than $\sqrt{2.33}$, and is higher than $\sqrt{2.5}$ within similar exposure time and providing similar resolution limits.

EXAMPLE 4

FIGS. 12A-12C show experimental results of Gamma imaging of a resolution test object having a plurality of lead lines with different density on a surface. FIG. 12A shows image of the test object through a single pinhole of diameter sources marked clearly and a multiplicity of points resulting from input radiation from the sources of the other location.

This technique allows the use of X-ray and Gamma imaging for localizing of tumors or other radiation sources without the need to collect plurality of images from different locations. And in general to reduce radiation collection time thus allowing the use of faster decaying radiation sources and reduce the damage to the subjects.

EXAMPLE 6

FIGS. 14A-14C as well as FIGS. 15A-15D show alternative aperture array arrangement suitable for use with the technique of the present invention. As described above, the arrangement of apertures in the aperture arrays is selected to provide non-null transmission in all spatial frequencies within the desired resolution limits.

FIGS. 14A and 14B show a set of two aperture arrays, each having 25 apertures in a predetermined arrangement providing together an effective transmission function with finite transmission in all spatial frequencies within the resolution of a single pinhole of the corresponding diameter as well as beyond that resolution. The absolute value of the total effective transmission function is shown in FIG. 14C. This graph shows the total effective transmission function $G_{total}$ with respect to transmission of a single pinhole of a similar diameter $G_0$. Such set of aperture arrays provide RII of 25 and thus increases brightness of imaging 25 times with respect to imaging through a single pinhole. Alternatively, this technique can be used to provide similar brightness with reduces exposure time.

Figure 15A:
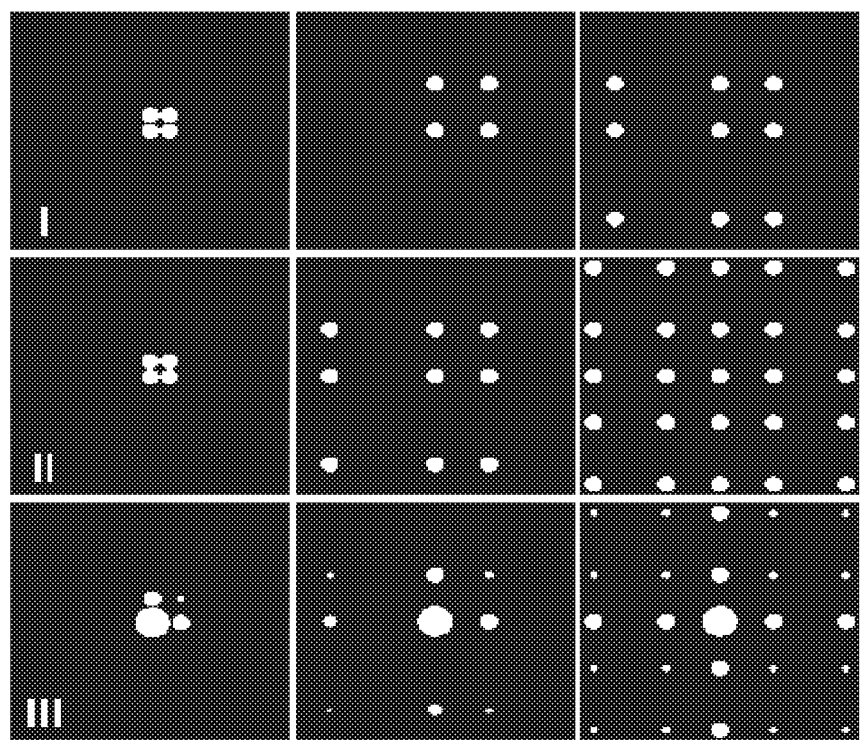
FIGS. 15A-15D exemplify three sets of aperture arrays having different arrangement and aperture diameters.
Figure 15B:
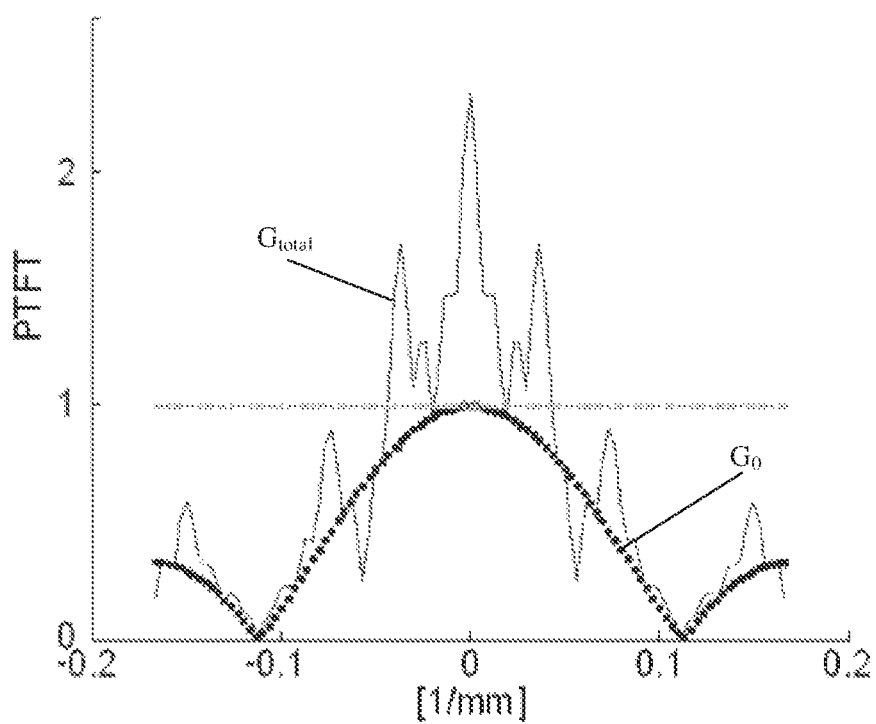
Figure 15C:
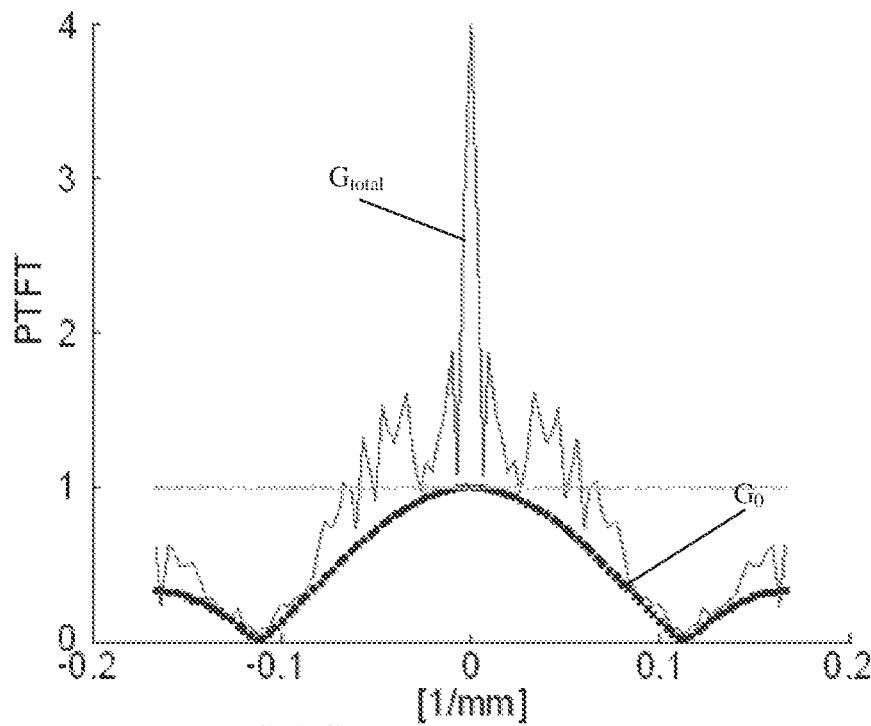
Figure 15D:
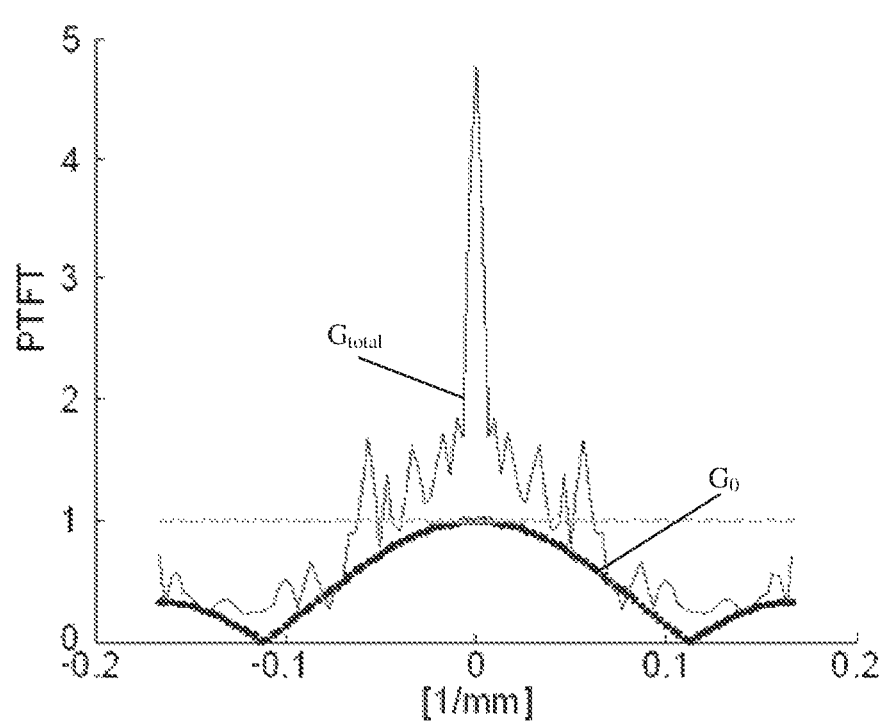

Additionally, FIGS. 15A-15D exemplify the use of aperture arrays having different pinhole diameters. FIG. 15A shows three sets of aperture arrays of similar arrangement. Set I is similar to the aperture arrangement described in FIGS. 9A-9D and Table 1. Sets II is configured with additional apertures and set III provides apertures of different diameters to allow higher brightness. FIGS. 15B to 15D show respective total effective transmission functions with respect to transmission of a single pinhole. Specifically, FIG. 15B is the total effective transmission of set I; FIG. 15C shows the total effective transmission function of set II; and FIG. 15D shows the total effective transmission function of set III. As shown the use of additional apertures provides the total effective transmission to be greater in modulus with respect to the transmission of a single pinhole for more spatial frequencies. Thus providing higher imaging efficiency with respect to both brightness and contrast while does not require and loss in resolution and/or exposure time.

Thus the present invention provide a technique and system for imaging a region of interest through two or more aperture arrays and for reconstruction of the acquired image data to provide reconstructed images of the region of interest. The technique can be used with any wavelength of electromagnetic radiation including, but not limited to, infrared radiation, visible light radiation, ultra violet radiation, X-ray radiation, Gamma radiation or any other wavelength where a blocking material can be used. The technique may also be used to provide depth information based on image data without the need to move the imaging system or the object.

The invention claimed is:

1. A method for imaging a region of interest comprising:
   (a) collecting input radiation from the region of interest through a selected set of a plurality of a predetermined number of aperture arrays, each array having a predetermined arrangement of apertures and collecting the input radiation during a collection time period, wherein said selected set of the aperture arrays and the corresponding collection time periods defining a total effective transmission function of the radiation collection,
   (b) generating image data from the collected input radiation, said image data comprising said predetermined number of image data pieces corresponding to the input radiation collected through the aperture arrays respectively,
   (c) processing the image data pieces utilizing said total effective transmission function of the radiation collection, and determining a restored image of the region of interest.

2. The method of claim 1, wherein said set of aperture arrays is selected such that said total effective transmission function provides non-null transmission for spatial frequencies being lower than a predetermined maximal spatial frequency.

3. The method of claim 2, wherein said corresponding collection time periods of the selected aperture arrays are selected for optimizing transmission intensities for selected spatial frequencies.

4. The method of claim 1, wherein said minimal aperture size defining the maximal spatial frequency is selected in accordance with geometrical resolution of image detection.

5. The method of claim 1, further comprising detecting said image data pieces using a single readout mode for all of said collection time periods of the aperture arrays, thereby integrating said image data pieces to form the image data in one scan time while selectively using the different aperture arrays.

6. The method of claim 1, wherein said processing of the image data pieces for restoring the image of the region of interest comprises: determining a sum of intensity maps of said image data pieces and utilizing inverting the distortion effect caused by the total effective transmission function, to thereby generate said restored image data.

7. The method of claim 1, wherein said input radiation is electromagnetic radiation in at least one of the following spectra: infra-red radiation, visible light, ultra violet radiation, x-ray radiation, and gamma radiation.

8. The method of claim 1, wherein said processing of the image data pieces for determining the restored image data further comprises: providing a set of at least two different depth resolved effective transmission functions each corresponding to the collection of the input radiation from an object plane of the region of interest located at a different distance from said set of the aperture arrays; for each of the depth resolved effective transmission functions, determining a partially restored image data piece corresponding to the respective object plane; and generating data indicative of a three-dimensional restored image of the region of interest.

9. The method of claim 1, wherein selection of said set of a plurality of a predetermined number of aperture arrays and the corresponding arrangement of apertures comprises: determining desired resolution for imaging and a corresponding minimal aperture dimension; determining the shape and angle of each aperture, determining a number of aperture to provide desired brightness of imaging; determining said predetermined number of arrays; determining aperture arrangement in each array to provide non-null total effective transmission function of the set of aperture arrays.

10. The method of claim 9, wherein said determining of aperture arrangement comprises: determining aperture arrangement of a first array; determining a corresponding effective transmission function; identifying spatial frequencies for which said effective transmission function provides transmission lower than a predetermined threshold; and determining one or more additional aperture arrangement such that transmission of said one or more of the additional aperture arrangement at said identified spatial frequencies is above a predetermined threshold.

11. An imaging system comprising:
   (a) a mask defining a radiation collection surface for spatial filtering of input radiation being collected, the mask comprising a plurality of apertures and being configured and operable to selectively provide a plurality of a predetermined number of spatial filtering patterns of the mask, each filtering pattern being formed by a predetermined arrangement of apertures in said collection surface;

(b) a control unit comprising: a filtering controller module; an image acquisition module and an image processing module; wherein the filtering module is configured for operating said mask to selectively collect the input radiation by different filtering patterns during selected exposure time periods; the image acquisition module is configured for receiving image data pieces corresponding to the collection of the input radiation through said filtering patterns respectively during said selected exposure time periods; and the image processing module is configured for receiving and processing the image data pieces and utilizing data indicative of a total effective transmission function of the radiation collection through said mask, and determining a restored image data of a region of interest from which the input radiation is being collected.

12. The system of claim 11, wherein said selected a plurality of a predetermined number of spatial filtering patterns of the mask being preselected to provide said effective transmission function with non-null transmission for spatial frequencies lower than a desired predetermined maximal spatial frequency.

13. The system of claim 11, wherein said mask being configure as a replaceable mask comprising plurality of a predetermined number of spatial filtering patterns such that the mask may be configured to selectively place a spatial filtering patterns on the radiation collection surface of the mask.

14. The system of claim 11, wherein said mask has at least one of the following configurations: mechanical wheel comprising said two or more aperture arrays each defining a corresponding filtering pattern, and a radiation transmission modulator configured to electronically vary filtering pattern thereof.

15. The system of claim 11, wherein said mask comprises a multiplexed arrangement of apertures corresponding to said predetermined number of spatial filtering patterns, said multiplexed arrangement of apertures comprising groups of apertures corresponding to different filtering patterns, each group of apertures comprises a wavelength selective filter configured for transmission of a predetermined wavelength range being a part of a total wavelength range for imaging.

16. The system of claim 11, wherein the processor unit further comprising a set selection module configured to be responsive to input data comprising data about desired resolution and brightness and to determine a corresponding set of filtering patterns having non-null effective transmission function.

17. The system of claim 11, wherein the processor unit further comprising a depth resolution pre-processing module configured to determine depth resolved effective transmission function in accordance with aperture arrangement of the set of filtering patterns.

18. The system of claim 17, wherein the image processing module is configured and operable to determine a plurality of restored depth resolved image data pieces, each of the depth resolved restored image data pieces corresponds to a selected object plane in accordance with a corresponding depth resolved effective transmission function, thereby providing three-dimensional information about the region of interest.

19. The system of claim 11, configured for imaging with input radiation of at least one of the following wavelength ranges: IR radiation, visible light radiation, UV radiation, X-ray radiation, Gamma radiation.

20. A method for use in pinhole based imaging, the method comprising: determining a pinhole dimension based on data about: locations of object plane, location of image plane and desired maximal resolution; determining a desired number of apertures based on desired image brightness per time unit; selecting a first aperture array comprising one or more apertures of the desired dimension and shape; determining a first set of spatial frequency values for which transmission of said first aperture array is below a predetermined threshold; determining at least one additional aperture array having aperture arrangement providing that transmission at said first set of spatial frequencies is above a corresponding predetermined threshold; wherein a total number of apertures divided by a total number of arrays provides a factor for said desired brightness per time unit.

* * * * *